United States Patent
Vecziedins et al.

(10) Patent No.: US 9,493,366 B2
(45) Date of Patent: Nov. 15, 2016

(54) INDUCTIVELY COUPLED DIELECTRIC BARRIER DISCHARGE LAMP

(75) Inventors: Karlis Vecziedins, Caledonia, MI (US); Michael E. Miles, Grand Rapids, MI (US);
(Continued)

(73) Assignee: ACCESS BUSINESS GROUP INTERNATIONAL LLC, Ada, MI (US)

( * ) Notice: Subject to any disclaimer, the term of this patent is extended or adjusted under 35 U.S.C. 154(b) by 1365 days.

(21) Appl. No.: 13/152,351

(22) Filed: Jun. 3, 2011

(65) Prior Publication Data
US 2011/0297844 A1    Dec. 8, 2011

Related U.S. Application Data

(60) Provisional application No. 61/351,604, filed on Jun. 4, 2010.

(51) Int. Cl.
*G21K 5/00* (2006.01)
*C02F 1/32* (2006.01)
(Continued)

(52) U.S. Cl.
CPC .............. *C02F 1/325* (2013.01); *H01F 38/14* (2013.01); *H01J 5/54* (2013.01); *H01J 5/62* (2013.01);
(Continued)

(58) Field of Classification Search
CPC .................. C02F 1/32; C02F 1/325; C02F 2201/3223; C02F 2201/326; C02F
(Continued)

(56) References Cited

U.S. PATENT DOCUMENTS 3,534,310 A * 10/1970 Pelissier Yves ........ H01F 38/14
                                                    336/205
3,682,098 A * 8/1972 Spies ...................... F41A 19/63
                                                    102/206
(Continued)

FOREIGN PATENT DOCUMENTS

DE    20 2007 012248      11/2007
GB       1366134 A * 9/1974
(Continued)

OTHER PUBLICATIONS

PCT Partial International Search Report for App. No. PCT/US2011/038983 mailed Oct. 31, 2011.
(Continued)

*Primary Examiner* — Wyatt Stoffa
(74) *Attorney, Agent, or Firm* — Warner Norcross & Judd LLP

(57) ABSTRACT

A dielectric barrier discharge lamp assembly for a fluid treatment system. The lamp assembly can include an inductive secondary, first and second electrodes coupled to the inductive secondary, and a lamp including a dielectric barrier interposed between the first and second electrodes. The dielectric barrier can define a discharge chamber including a discharge gas, and one of the first and second electrodes can extend within the discharge chamber. The inductive secondary can be adapted to receive power from a nearby inductive primary to promote a dielectric barrier discharge in the discharge chamber. The resulting dielectric barrier discharge can generate ultraviolet light for the treatment of air or water, or for other applications.

13 Claims, 21 Drawing Sheets

(75) Inventors: Joshua K. Schwannecke, Grand Rapids, MI (US); David A. Meekhof, Grand Rapids, MI (US); Donovan L. Squires, Grand Rapids, MI (US); William T. Stoner, Jr., Ada, MI (US); Matthew J. Norconk, Grand Rapids, MI (US); Richard B. Bylsma, Ada, MI (US); Matthew J. Lilley, Walker, MI (US)

(51) Int. Cl.
*H01F 38/14* (2006.01)
*H01J 5/54* (2006.01)
*H01J 5/62* (2006.01)
*H01J 65/04* (2006.01)
*C02F 1/28* (2006.01)

(52) U.S. Cl.
CPC ............ *H01J 65/046* (2013.01); *C02F 1/283* (2013.01); *C02F 2201/326* (2013.01); *C02F 2201/3223* (2013.01); *C02F 2209/005* (2013.01); *C02F 2209/008* (2013.01); *C02F 2209/40* (2013.01); *C02F 2303/04* (2013.01); *H01J 65/048* (2013.01)

(58) Field of Classification Search
CPC ............ 2209/40;C02F 2303/04; H01F 38/14; H01J 5/54; H01J 5/62; H01J 65/046; H01J 65/048
See application file for complete search history.

(56) References Cited

U.S. PATENT DOCUMENTS

| | | | |
|---|---|---|---|
| 4,475,062 A * | 10/1984 | Radenkovich | H05B 41/2325 315/177 |
| 4,837,484 A | 6/1989 | Eliasson et al. | |
| 4,887,029 A * | 12/1989 | Hemminger | G01R 5/00 324/107 |
| 4,945,290 A | 7/1990 | Eliasson et al. | |
| 5,343,114 A | 8/1994 | Beneking et al. | |
| 5,444,331 A | 8/1995 | Matsuno et al. | |
| 5,558,071 A * | 9/1996 | Ward | F02P 3/02 123/598 |
| 5,581,152 A | 12/1996 | Matsuno et al. | |
| 5,604,410 A | 2/1997 | Vollkommer et al. | |
| 5,666,026 A | 9/1997 | Matsuno et al. | |
| 5,757,132 A | 5/1998 | Matsuno et al. | |
| 5,763,999 A | 6/1998 | Matsuno et al. | |
| 5,831,394 A | 11/1998 | Huber et al. | |
| 5,834,784 A | 11/1998 | Morgan et al. | |
| 5,929,599 A * | 7/1999 | Watanabe | H01F 38/14 320/108 |
| 5,936,358 A | 8/1999 | Okamoto et al. | |
| 5,955,840 A | 9/1999 | Arnold et al. | |
| 6,084,360 A | 7/2000 | Yokokawa et al. | |
| 6,201,355 B1 | 3/2001 | Morgan et al. | |
| 6,225,758 B1 | 5/2001 | Vollkommer et al. | |
| 6,249,090 B1 | 6/2001 | Popov et al. | |
| 6,294,869 B1 | 9/2001 | Adachi et al. | |
| 6,297,599 B1 | 10/2001 | Dirscherl et al. | |
| 6,356,033 B1 | 3/2002 | Okamoto et al. | |
| 6,369,519 B1 | 4/2002 | Okamoto et al. | |
| 6,379,024 B1 | 4/2002 | Kogure et al. | |
| 6,398,970 B1 | 6/2002 | Justel et al. | |
| 6,437,494 B1 | 8/2002 | Inayoshi | |
| 6,469,435 B1 | 10/2002 | Seibold et al. | |
| 6,495,972 B1 | 12/2002 | Okamoto et al. | |
| 6,504,320 B2 | 1/2003 | Feldmann et al. | |
| 6,525,451 B1 | 2/2003 | Hishinuma et al. | |
| 6,525,472 B2 | 2/2003 | Okugi | |
| 6,541,924 B1 | 4/2003 | Kane et al. | |
| 6,568,774 B2 | 5/2003 | Hitzschke et al. | |
| 6,570,301 B1 | 5/2003 | Hishinuma et al. | |
| 6,628,078 B2 | 9/2003 | Inayoshi | |
| 6,633,109 B2 | 10/2003 | Falkenstein | |
| 6,686,681 B1 | 2/2004 | Allgeier et al. | |
| 6,696,781 B2 | 2/2004 | Custodis et al. | |
| 6,777,879 B2 | 8/2004 | Juestel et al. | |
| 6,787,979 B2 | 9/2004 | Juestel et al. | |
| 6,788,008 B2 | 9/2004 | Hiraoka et al. | |
| 6,847,157 B2 | 1/2005 | Kling et al. | |
| 6,924,599 B2 | 8/2005 | Doll et al. | |
| 6,982,526 B2 | 1/2006 | Schallmoser | |
| 7,053,542 B2 | 5/2006 | Juestel et al. | |
| 7,122,951 B2 | 10/2006 | Heider et al. | |
| 7,291,979 B2 | 11/2007 | Doll | |
| 7,298,077 B2 | 11/2007 | Justel et al. | |
| 7,522,878 B2 * | 4/2009 | Baarman | A61L 2/10 235/492 |
| 7,615,933 B2 | 11/2009 | Hooke et al. | |
| 7,622,868 B2 * | 11/2009 | Baarman | H01J 5/50 315/114 |
| 7,642,732 B2 | 1/2010 | Kominami et al. | |
| 7,656,095 B2 | 2/2010 | Dellian et al. | |
| 2002/0011434 A1 | 1/2002 | Kuennen et al. | |
| 2002/0089275 A1 | 7/2002 | Falkenstein | |
| 2002/0130642 A1 * | 9/2002 | Ettes | H01F 38/14 323/247 |
| 2002/0162779 A1 * | 11/2002 | Kuennen | A61L 2/10 210/109 |
| 2003/0015478 A1 * | 1/2003 | Kuennen | A61L 2/10 210/748.11 |
| 2004/0164686 A1 * | 8/2004 | Baarman | A61L 2/10 315/244 |
| 2004/0182761 A1 * | 9/2004 | Kuennen | A61L 2/10 210/136 |
| 2004/0183448 A1 * | 9/2004 | Hsueh | H01F 27/326 315/57 |
| 2005/0029948 A1 | 2/2005 | Kling et al. | |
| 2006/0006804 A1 | 1/2006 | Reich et al. | |
| 2007/0051902 A1 | 3/2007 | Justel et al. | |
| 2007/0247052 A1 | 10/2007 | Juestel et al. | |
| 2008/0047428 A1 | 2/2008 | Younsi et al. | |
| 2008/0061667 A1 | 3/2008 | Gaertner et al. | |
| 2008/0093967 A1 | 4/2008 | Schiene et al. | |
| 2008/0093971 A1 | 4/2008 | Greuel et al. | |
| 2008/0185536 A1 | 8/2008 | Schiene et al. | |
| 2008/0191638 A1 * | 8/2008 | Kuennen | A61L 2/10 315/279 |
| 2008/0197775 A1 | 8/2008 | Roth et al. | |
| 2008/0203891 A1 | 8/2008 | Gaertner et al. | |
| 2008/0224544 A1 * | 9/2008 | Koyama | G06F 3/046 307/104 |
| 2008/0258648 A1 | 10/2008 | Bleukx et al. | |
| 2008/0265775 A1 | 10/2008 | Schiene et al. | |
| 2008/0284335 A1 | 11/2008 | May et al. | |
| 2009/0066250 A1 | 3/2009 | Reich et al. | |
| 2009/0085408 A1 * | 4/2009 | Bruhn | H01F 38/14 307/104 |
| 2009/0120882 A1 | 5/2009 | Voronov et al. | |
| 2009/0230777 A1 * | 9/2009 | Baarman | H01F 38/14 307/104 |
| 2009/0290332 A1 * | 11/2009 | Jacobs | F21V 23/02 362/183 |
| 2010/0190436 A1 | 7/2010 | Cook et al. | |
| 2011/0298298 A1 * | 12/2011 | Baarman | A61L 2/10 307/104 |
| 2012/0132573 A1 * | 5/2012 | Lautzenheiser | C02F 1/008 210/85 |
| 2014/0077696 A1 * | 3/2014 | Kuennen | A61L 2/10 315/34 |
| 2014/0139041 A1 * | 5/2014 | Bohori | H01F 38/14 307/104 |

FOREIGN PATENT DOCUMENTS

| | | |
|---|---|---|
| JP | 2003-112179 | 4/2003 |
| JP | 2006-286584 | 10/2006 |
| JP | 2006286584 | 10/2006 |

(56) References Cited

FOREIGN PATENT DOCUMENTS

| WO | 00/78678 | 12/2000 |
| WO | WO 02/35578 | 5/2002 |
| WO | 2006056921 | 6/2006 |
| WO | WO 2006/077498 | 7/2006 |
| WO | WO2006077498 | 7/2006 |

OTHER PUBLICATIONS

PCT International Written Opinion for App. No. PCT/US2011/038983 mailed Mar. 29, 2012.
PCT International Search Report for App. No. PCT/US2011/038983 mailed Mar. 29, 2012.

* cited by examiner

INDUCTIVELY COUPLED DIELECTRIC BARRIER DISCHARGE LAMP

BACKGROUND OF THE INVENTION

The present invention relates to dielectric barrier discharge lamps. In particular, the present invention relates to dielectric barrier discharge lamps for use in fluid treatment systems, luminary systems and other applications.

Dielectric barrier discharge lamps are generally known and are used in a variety of applications where electromagnetic radiation of a particular wavelength is desired. For example, some applications include wastewater treatment and/or the disinfection of drinking water. These applications can require ultraviolet radiation with wavelengths between about 100 nm and 280 nm. Other applications include generating visible light for general lighting, which can require wavelengths between about 380 nm and 750 nm.

Dielectric barrier discharge lamps can generally be of any form. One of the simplest forms of dielectric barrier discharge lamps includes an outer tube and a coaxial inner tube forming an annular discharge chamber therebetween. An electrode within the inner tube and a counter-electrode about the exterior of the outer tube are spaced apart by the annular discharge chamber. The chamber normally includes a noble or rare gas, such as xenon, which emits a primary radiation as soon as a gas discharge, especially a dielectric barrier discharge, is initiated inside the discharge chamber. During dielectric barrier discharge, xenon molecules disassociate into ions and electrons and become xenon plasma. When the xenon plasma is excited to a specific energy level, eximer molecules are formed within the plasma. The eximer molecules divide after a certain lifespan, releasing photons having a peak wavelength of about 172 nm for xenon plasma. This energy can be converted to a range of 175 nm-280 nm through a luminescent layer deposited on the interior of the outer tube. At least the outer tube can be formed of a translucent material, such as quartz, to transmit ultraviolet radiation for the disinfection of water or air, or for other applications.

Prior art systems can also include a step-up transformer wound about a common magnetic core for converting a mains or first voltage into a second voltage for application across the electrode and the counter-electrode. However, the step-up transformer must normally include physical connections to a power supply and the lamp body. In use, the connection (e.g., electrical contacts) between the transformer and the lamp body can be susceptible to fluid and corrosion. In addition, a major obstacle to the efficient treatment of fluid by prior art dielectric barrier gas discharge lamps is the irradiation of the fluid at levels above or below the level needed for adequate treatment.

SUMMARY OF THE INVENTION

A dielectric barrier discharge lamp assembly for a fluid treatment system is provided. The lamp assembly can include an inductive secondary, first and second electrodes coupled to the inductive secondary, and a lamp including a dielectric barrier interposed between the first and second electrodes. The dielectric barrier can define a discharge chamber including a discharge gas, and one of the first and second electrodes can extend within the discharge chamber. The inductive secondary can be adapted to receive power from a nearby inductive primary to promote a dielectric barrier discharge in the discharge chamber. The resulting dielectric barrier discharge can generate ultraviolet light for the treatment of air or water, or for other applications.

In one embodiment, the lamp includes an inner tube spaced apart from an outer tube to define a discharge gap therebetween. Application of a high voltage between the first and second electrodes can result in an electrical discharge in the discharge gap to emit light through the exterior of the lamp and to a surrounding fluid. The surrounding fluid, for example water, can optionally function as an extension of an electrode. Optionally, the lamp assembly can include a conductive mesh coupled to an electrode and applied to the exterior of the lamp. Further optionally, the lamp assembly can include an electrically permitable member spaced apart from the lamp to accommodate a fluid therebetween. The electrically permitable member can generally separate the fluid from one or both of the first and second electrodes to prevent ionization of the fluid, for example.

In another embodiment, a base station is provided. The lamp assembly can be removably received within the base station, and the base station can include an inductive primary to provide a source of wireless power to the lamp assembly. The base station can further include a primary circuit having a controller, a lamp pulse driver, a lamp sensor, and a water flow sensor. The controller can be electrically coupled to the lamp pulse driver to drive the inductive primary with a series of short duration pulses. The controller can monitor feedback from the lamp sensor and the water flow rate sensor to control performance of the lamp pulse driver.

In still another embodiment, the inductive secondary and the lamp can be coaxial, and the inductive secondary can extend around at least a portion of the lamp. The inductive primary and the inductive secondary can be arranged in concentric relationship to each other, with the inductive secondary including a magnetic core and defining an outer diameter that is less than an inner diameter defined by the inductive primary. Alternatively, the inductive secondary can define an inner diameter that is greater than an outer diameter defined by the inductive primary, the primary including a magnetic core. The lamp assembly can include a secondary housing to at least partially encapsulate the inductive secondary and to at least partially interfit with the base station.

In yet another embodiment, the base station can include a fluid quality sensor. The fluid quality sensor can have an output electrically connected to the controller, and the fluid quality sensor may be configured to determine a characteristic of the fluid being treated, including for example the fluid turbidity, pH, or temperature. Based on the output of the fluid quality sensor, the controller can control or vary the intensity of ultraviolet light emitted from the lamp assembly. Optionally, the lamp can include a luminescent layer to convert radiated light to ultraviolet wavelengths, or the lamp can include a gas to emit ultraviolet radiation without the aid of a luminescent layer.

In still another embodiment, the lamp assembly can be adapted to be driven by an existing base station for a wirelessly powered gas discharge lamp, a wirelessly powered incandescent lamp, or other wirelessly powered device. In this embodiment, the lamp assembly can include a lamp pulse driver electrically connected between the inductive secondary and the first and second electrodes. The lamp pulse driver can be adapted to convert a first time-varying voltage induced in the inductive secondary into a second time-varying voltage applied across the first and second electrodes to induce a dielectric barrier discharge in the discharge chamber.

In even another embodiment, the lamp assembly can include an RF antenna and a memory tag for wireless communication with the base station, and optionally the inductive primary. For example, the inductive primary can be operable in a communications mode to read data from and write data to the memory tag, such as the quantity of water treated, the number of illuminations of the dielectric barrier discharge lamp, and the illumination time. Additionally, the inductive primary can be operable to read data from the memory tag, such as the cumulative prior operational data from the tag and a unique lamp serial number. By comparing the cumulative operational data against recommended limits for a given lamp assembly, the base station can provide users and/or service personnel with, among other things, usage information or an indication of the correct time for replacing the lamp assembly or other components. In operation, the system may be configured to read data from the memory tag before each use and may be configured to write the data to the memory tag after each use. The use of the primary coil as an RF reader/writer coil can also eliminate the need for a separate coil for RF communications.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments relate to an inductively powered dielectric barrier discharge lamp assembly. The lamp assembly generally includes an inductive secondary, first and second spaced apart electrodes that are electrically coupled to the inductive secondary, and a lamp including a dielectric barrier interposed between the electrodes. As noted below, the lamp assembly can be used across a wide variety of applications, including fluid treatment systems and luminary systems, for example.

Figure 1:
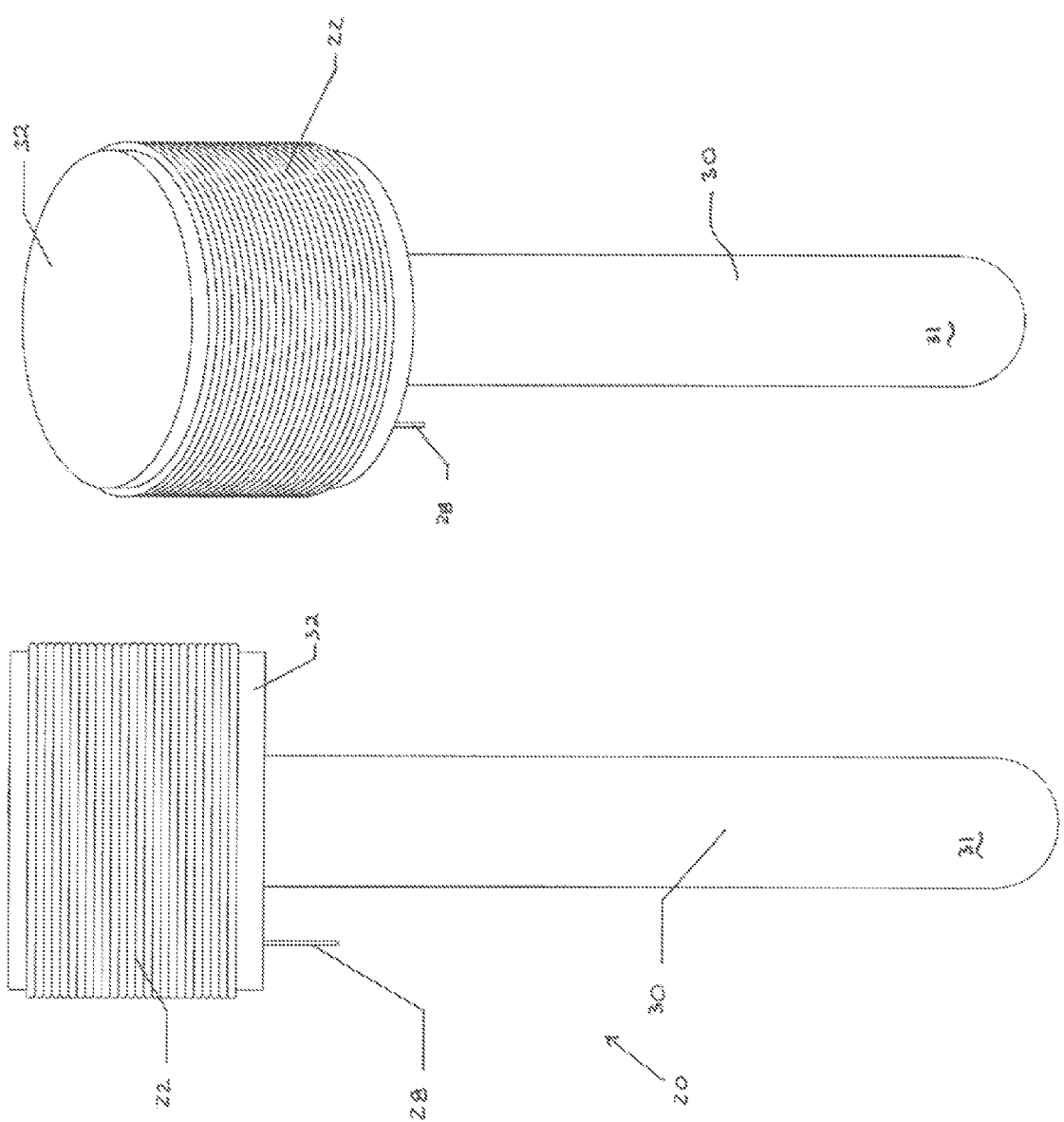
FIG. 1 illustrates elevational and perspective views of a dielectric barrier discharge lamp assembly.
Figure 2:
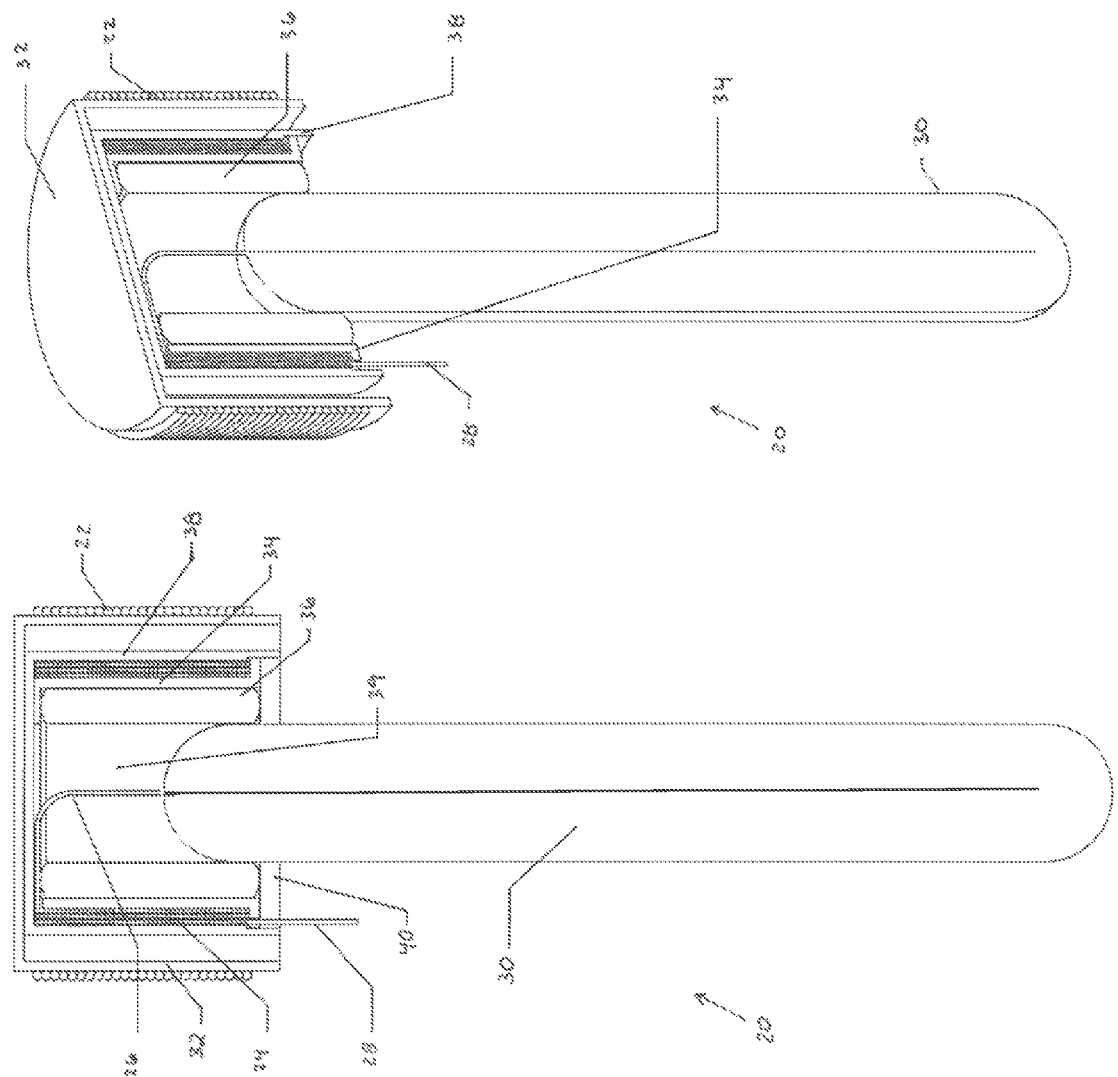
FIG. 2 illustrates vertical cross-sectional views of the lamp assembly of FIG. 1.
Figure 3:
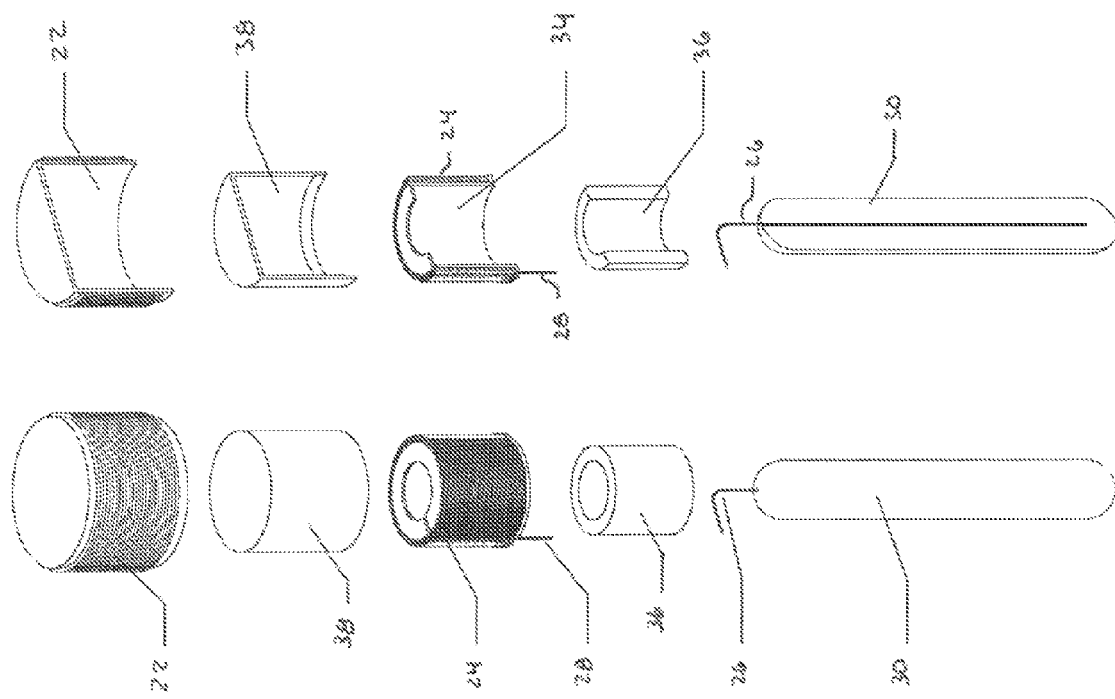
FIG. 3 illustrates partially exploded views of the lamp assembly of FIG. 1.

Referring now to FIGS. 1-3, a lamp assembly according to a first embodiment is illustrated and generally designated 20. The lamp assembly 20 includes an inductive secondary or secondary coil 24 adapted to receive wireless power from a nearby inductive primary or primary coil 22, a first electrode 26 electrically coupled to the secondary coil 24, a second electrode 28 electrically coupled to the secondary coil 24, and a dielectric barrier discharge lamp body 30. The secondary coil 24 can include any element adapted to generate an internal electrical current in response to an external time-varying electromagnetic field. For example, the secondary coil 24 can be formed of a conducting element wound one or more times around an axis, while in other embodiments the secondary coil 24 can include a stamped or printed conductive winding in a non-conductive substrate. The first and second electrodes 26, 28 can be an extension of the secondary coil 24, or can be separately formed and electrically coupled to respective end portions of the secondary coil 24.

The lamp body 30 can be any lamp body including a dielectric barrier, and can be tubular in form, flat, or of any shape suitable for a particular application. As shown in FIG. 2, the first electrode 26 can extend longitudinally along the length of the lamp body 30, while in other embodiments the first electrode 26 can form a grid about the interior of the lamp body 30. The lamp body 30 can be at least partially surrounded by a fluid, for example water, which can then function as an extension of the second electrode 28. The first and second electrodes can be spaced apart by at least one dielectric barrier 31 and a discharge gas, including, for example, xenon, a rare gas, or a rare gas-halide mixture. As explained below, application of a high voltage potential across the first and second electrodes 26, 28 can result in electrical discharge in the region occupied by the discharge gas, optionally resulting in the radiation of light, for example ultraviolet light, through the exterior of the lamp body 30 to a surrounding fluid.

As also shown in FIGS. 1-3, the lamp assembly 20 can include an annular magnetic core 36 having an outer radius less than the inner radius of a secondary coil bobbin 34. For example, the magnetic core 36 can be disposed within the interior of the second bobbin 34, being radially spaced apart from the secondary coil 24. In certain applications, however, a magnetic core may not be desired, and the region within the interior of the second bobbin 34 can be filled with a gas or waterproof potting compound 39, for example. The secondary coil 24, second bobbin 34 and magnetic core 36 can be encased by a secondary housing 38, with the first and second electrodes 26, 28 protruding axially from the secondary housing 38. As noted above, the interior of the secondary housing 38, if desired, can be filled with a waterproof potting compound 39 to seal and optionally waterproof the components in the housing interior. As shown in the illustrated embodiment, an o-ring, seal or gasket 40 can be interposed between the inner radius of the secondary housing 38 and the outer radius of the lamp body 30 to further seal the housing interior.

While shown as including an outer tube 31 formed of a dielectric material encapsulating a substantial portion of the first electrode 26, the lamp body 30 can for example include an inner tube fitted within and spaced apart from the outer tube 31 to form a discharge gap therebetween. In this configuration, at least one of the inner and outer tubes can be formed of a suitable dielectric material, including quartz, glass or ceramic, for example. In addition, at least one of the inner or outer tubes can be formed of an at least partially transparent material, optionally quartz, to allow the transmission of light from inside the lamp body 30. The lamp body 30 can further include a luminescent layer or coating suitable for transferring the radiation generated inside the lamp body 30 to a different (e.g., higher) wavelength, which can be emitted via the partially transparent outer tube 31. For example, the coating may convert the discharged light into germicidal ultraviolet light in wavelengths between approximately 175 nm and approximately 280 nm, while in other embodiments the emitted wavelengths can vary within or outside of this range. Alternatively, or in addition, the lamp body 30 can contain a gas adapted to radiate ultraviolet light without the aid of a fluorescent coating. This gas can include for example krypton chloride adapted to radiate light in wavelengths between approximately 220 nm and approximately 240 nm, optionally approximately 230 nm, while other gases may be utilized in other embodiments as desired.

As noted above and depicted in FIG. 4, the secondary coil 24 can be inductively coupled with a primary coil 22 associated with a base station 42. The base station 42 can be any device adapted to provide a source of wireless power, optionally a point-of-use water treatment system or other device. For example, the base station 42 can include a point-of-use water treatment set forth in International Patent Application PCT/US2010/020623 to Lautzenheiser et al, filed Jan. 12, 2009, the disclosure of which is hereby incorporated by reference in its entirety. When the lamp assembly 20 is received within the base station 42, the primary and secondary coils 22, 24 can be positioned proximate each other to permit an inductive power transfer between the same. For example, the primary and secondary coils 22, 24 can optionally be wound about first and second concentric bobbins 32, 34, respectively, being radially offset from each other. Also by example, the primary and secondary coils 22, 24 can be coaxial and wound about first and second axially offset bobbins 32, 34 in a longitudinal end-to-end relationship, optionally including a common magnetic core. In these configurations, the lamp assembly 20, and consequently the secondary coil 24, can be physically separable from the base station 42 to extend the useful life of the base station 42, even as multiple lamp assemblies 20 are replaced over repeated uses. In some embodiments the base station 42 will be in fluid communication with a supply of water, air or other fluid. For example, the lamp assembly 20 can be encased in a water pressure vessel in the base station 42, with the water pressure vessel optionally forming the housing of a water purification unit. Because the secondary coil 24 and the lamp body 30 are separable from the primary coil 22, a user can readily inspect, repair or replace the secondary coil 24 and lamp body 30 without exposing moisture to any direct electrical connections that might otherwise connect the lamp assembly 20 to a suitable power supply.

Figure 4:
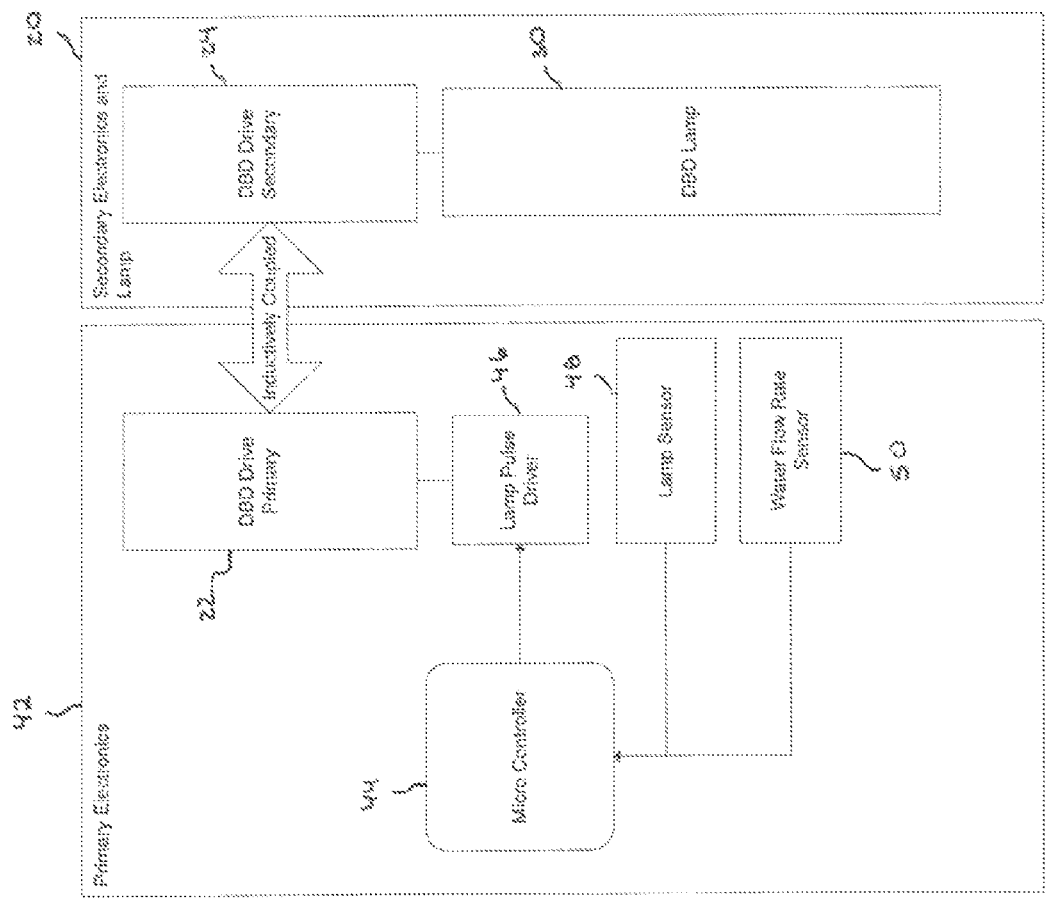
FIG. 4 is a block diagram of a base station and a lamp assembly.

As noted above, the base station 42 can be any device adapted to provide a source of wireless power, for example a point-of-use water treatment system or other device. Referring now to FIG. 4, the base station 42 can optionally include a microcontroller 44, a lamp pulse driver 46, a lamp sensor 48, a water flow sensor 50 and a primary coil 22. In addition, the lamp assembly 20 can include the secondary coil 24 and the lamp body 30, wherein the primary coil 22 and secondary coil 24 form separable components of an inductive coupling. The microcontroller 44 can be electrically coupled to the lamp pulse driver 46 and can be operable to drive the primary coil 22. In some applications, the lamp pulse driver 46 can convert an AC voltage, optionally a mains voltage, into a suitable pulsed DC waveform for driving the primary coil 22. In other applications, however, the lamp pulse driver 46 can convert a DC voltage, for example a rectified mains voltage, into a regulated pulsed DC waveform. In these and other configurations, the lamp pulse driver 46 can include any suitable drive circuitry for providing a regulated output, including, for example, a switching circuit and/or a switched-mode power supply. In operation, the lamp pulse driver 46 can provide a series of short duration pulses having variable parameters (e.g., frequency, duty cycle, phase, pulse width, amplitude, etc.) controllable by the microcontroller 44. Through operation of a time-varying current in the primary coil 22, a corresponding time-varying current is generated in the inductively-coupled secondary coil 24. For example, a pulsed DC voltage can be provided across the primary coil 22 and then released to ground. Upon release at each pulse, the voltage and/or current across the primary coil 22 rapidly changes. A corresponding pulsed waveform in the secondary coil 24 is then applied across first and second electrodes 26, 28 to create an electrical discharge in the lamp body discharge gap. The pulsed waveform in the secondary coil 24 is typically though not necessarily of a higher peak voltage than the pulsed waveform in the primary coil.

Figure 5:
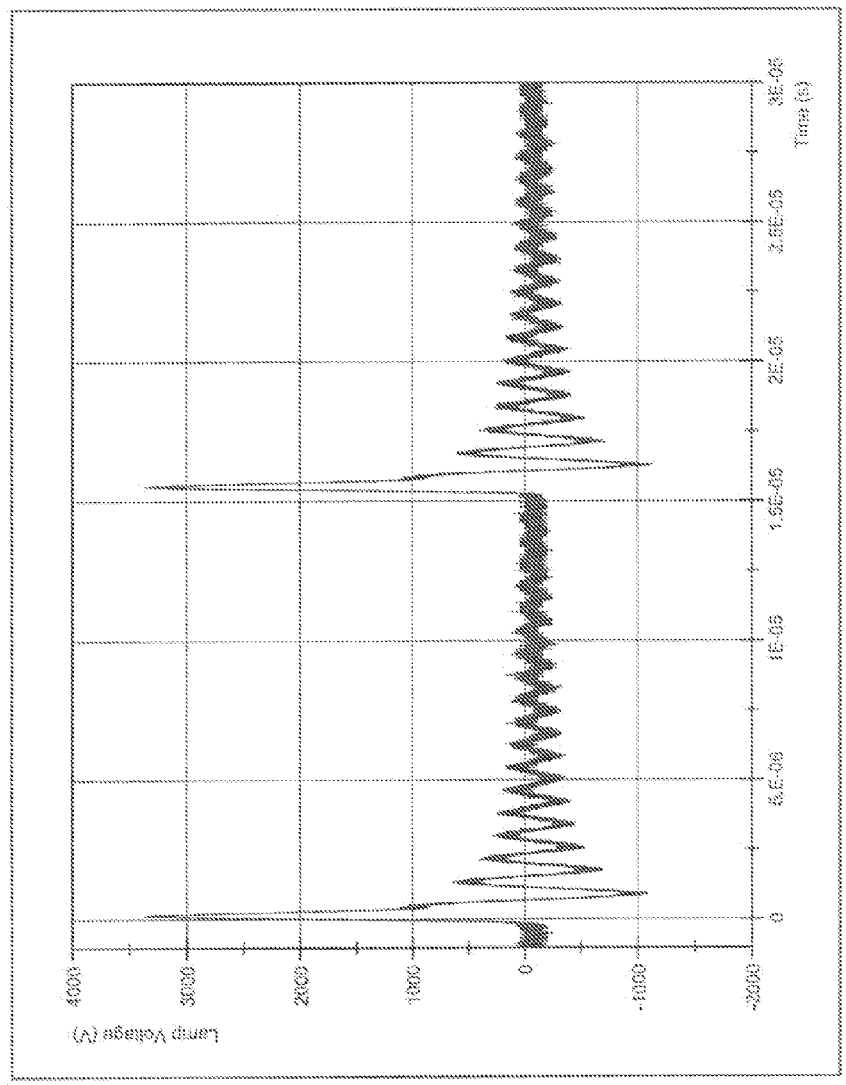
FIG. 5 is a graph illustrating lamp voltage over time.

FIG. 5 is illustrative of the lamp voltage, for example the voltage across the first and second electrodes 26, 28, during operation of the lamp assembly 20. At each driving pulse, the lamp voltage across the first and second electrodes 26, 28 rises rapidly to a peak voltage for the commencement of a dielectric discharge. For example, in some embodiments the driving pulse can include an amplitude between approximately 4.0 V and approximately 8.0 V, optionally approximately 6.0 V, while in other embodiments the driving pulse can vary within or outside of this range. The corresponding peak voltage across the first and second electrodes 26, 28 can be any voltage sufficient to induce a dielectric barrier discharge. For example, in some embodiments the peak voltage can be include a voltage between approximately 3.0 kV and approximately 4.0 kV, optionally approximately 3.4 kV, while in other embodiments the peak voltage across the electrodes 26, 28 can vary within or outside this range.

As also shown in FIG. 5, the frequency of the dielectric discharge can correspond to the driving frequency, including for example a frequency of approximately 66.7 kHz for a period of approximately 15 microseconds. In addition, the driving frequency can vary below or above approximately 66.7 kHz, optionally including frequencies above 100 kHz, including for example frequencies between approximately 300 kHz and approximately 600 kHz. Operating at these elevated frequencies can allow for a reduced driving voltage, duty cycle and/or pulse width without a corresponding decrease in lamp body luminescent intensity, and in some instances can achieve an unexpected increase or doubling of the luminescent intensity at discrete frequency ranges. For example, driving the first and second electrodes 26, 28 at frequencies above 100 kHz, including frequencies between approximately 300 kHz and approximately 600 kHz, can achieve a "double-peak" of approximately +3.4 kV and approximately −3.4 kV before decaying to nominal levels. At driving frequencies less than 100 kHz, the lamp voltage will normally achieve a single peak at +3.4 kV for example, followed by a nominal −1.0 kV value shown in FIG. 5. Because a relatively high voltage can in some instances be needed to achieve a dielectric discharge in the lamp body 30, discharge can occur in response to the lamp voltage being greater in magnitude than 1.0 kV, and optionally greater than 2.0 kV or greater than 3.0 kV. By varying the frequency and/or other characteristic(s) of the driving voltage, the microcontroller 44 can therefore control or influence the formation of eximers in the discharge gap and thereby control or influence the intensity of emitted ultraviolet light from the lamp body 30.

Figure 6:
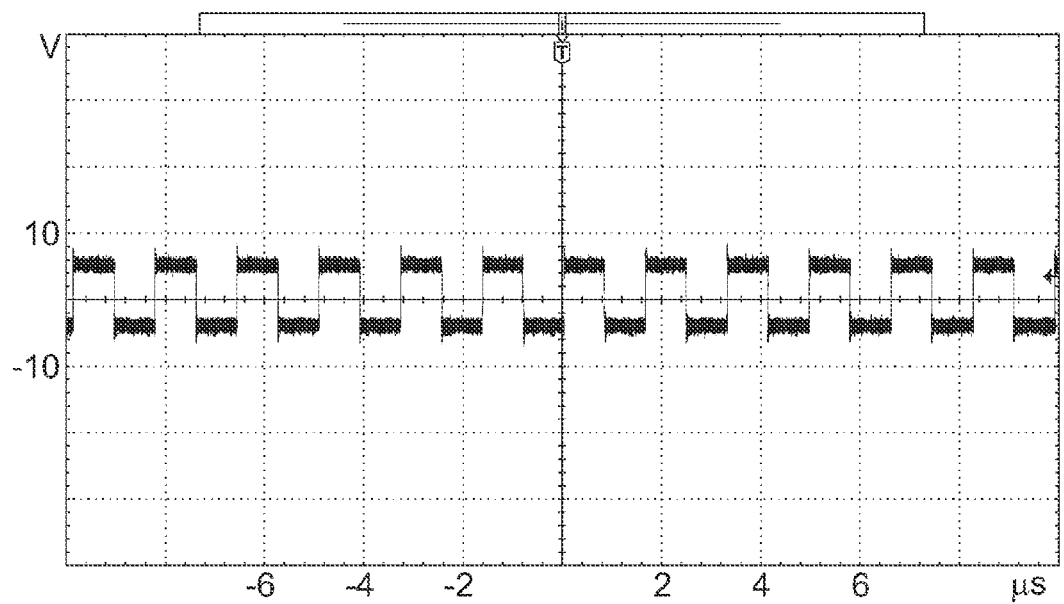
FIG. 6 is a graph illustrating driving voltage over time.
Figure 7:
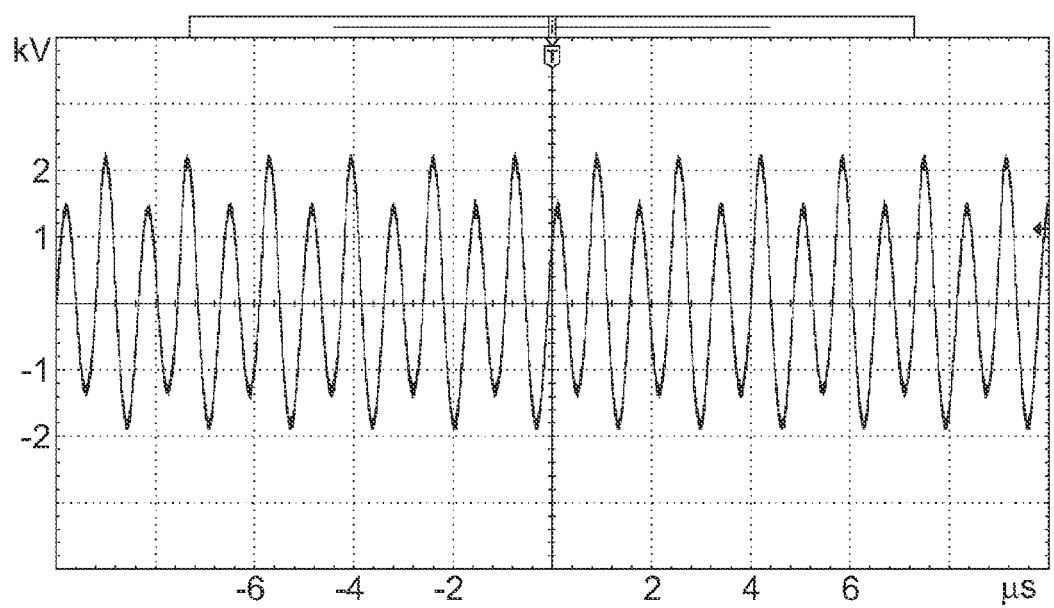
FIG. 7 is a graph illustrating the lamp voltage in response to the driving voltage of FIG. 6.

FIGS. 6-7 are further illustrative of a driving voltage in the primary coil 22 and the corresponding voltage across the first and second electrodes 26, 28 according to one embodiment. As shown in FIG. 6, the driving voltage includes an approximately +/−5.0 V alternating current square wave having a frequency of approximately 555.6 kHz, a duty cycle of approximately 50%, and a pulse width of approximately 0.9 microseconds. While these parameters or characteristics of the driving voltage are shown in FIG. 6 as being generally constant, the base station microcontroller 44 can vary one or more of these parameters to control the resulting luminescent output in the lamp body 30 as set forth above, optionally in response to feedback from one or more of the lamp sensor 48, the water flow rate sensor 50, or other sensor. In addition, the driving voltage can include a positive or negative D.C. offset if desired. For example, the square wave can include a +5.0 V D.C. offset such that the waveform is oscillates from zero to +10.0 V at each pulse. In addition, the driving voltage can be other than a square wave, and can include a variety of waveforms, including for example a sawtooth waveform, a triangle waveform, a sine waveform, or combinations thereof. The corresponding voltage across the first and second electrodes 26, 28 during operation of a lamp assembly 20 is shown in FIG. 7. Each driving pulse in the primary coil 22 generates a corresponding oscillatory voltage in the secondary coil 24, and thus the first and second electrodes 26, 28. For example, the 5.0 V, 0.9 microsecond driving pulse at t=0 generates a +/−1.5 kV peak voltage across the electrodes 26, 28, resulting in multiple dielectric discharges in the lamp body 30. At time t=0.9 microseconds, the driving pulse—having nearly instantaneously transitioned from +5.0V to −5.0V—generates a +/−2.1 kV peak voltage across the electrodes 26, 28, again resulting in multiple dielectric discharges in the lamp body 30. Thus, for each driving pulse, the electrodes 26, 28 can be driven with a time-varying voltage having multiple local maxima or minima, optionally resulting in a corresponding number of electrical discharge events in the lamp body.

Figure 8:
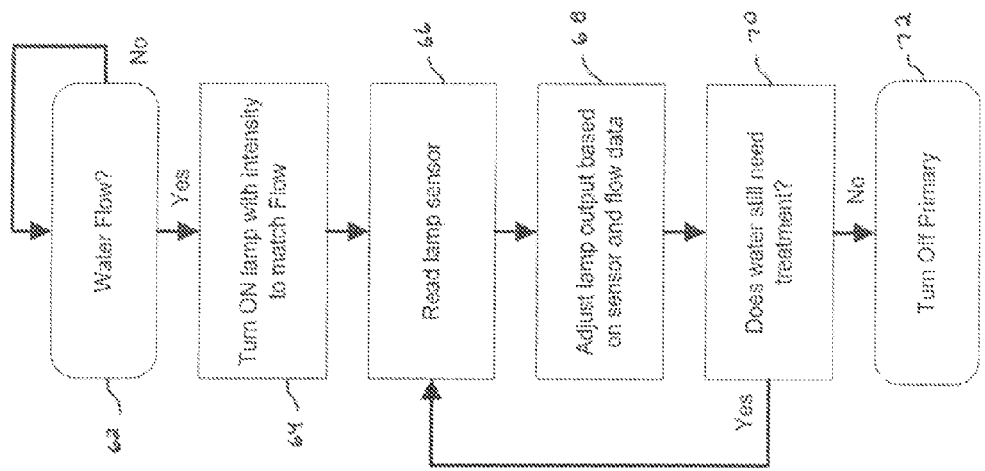
FIG. 8 is an operational flow chart of a water treatment system.

As noted above, the base station microcontroller 44 may also monitor feedback from the lamp sensor 48 and/or the water flow rate sensor 50 to optimize performance of the lamp driver 46. In particular, the microcontroller 44 may determine a primary coil 22 power output according to a formula or look-up table to provide the desired lamp output (e.g., intensity, peak wavelength, etc.) for a given set of conditions (e.g., flow rate, water quality, bulb life, etc.). A process for operating the lamp assembly 20 can be described in conjunction with the flowchart of FIG. 8. When water flow is detected by the water flow rate sensor 50 in step 62, the microcontroller 44 causes power to be delivered to the primary coil 22 at step 64. As noted above, the level of power to be delivered at step 62 is determined by the microcontroller 44 by formula or through the use of a look-up table. Generally, lower flow rates require lower ultraviolet lamp intensities because the water contact exposure to the ultraviolet light is longer when the flow is slower. Likewise, when the water flow rate is higher, the ultraviolet intensity generally needs to be higher because the water contact exposure to the ultraviolet light is shorter when the flow is faster. In certain applications, however, the lamp can operate at full intensity. In addition to determining a power output based on flow rate, the system may also adjust to the power delivery of the lamp based on the duration of water flow. For example, the first thirty seconds of water flow may require a higher power delivery to drive higher ultraviolet exposure, which may be reduced to a steady state level after the initial period of high power delivery. Likewise, other time-varying power delivery profiles may be applied based on the needs of the particular system. At step 66, the microcontroller 44 verifies operation of the lamp through the lamp sensor 48. If the lamp is verified to be on and at the correct intensity, the primary electronics 42 will continue to deliver the same power to the primary coil 22. If an adjustment is needed at step 68 based on the output of the lamp sensor 48 and/or water flow rate sensor 50, the system may also adjust the power delivery to the primary coil 22. If water treatment is determined to be no longer needed at step 70, the microcontroller 44 can stop operation of the lamp driver 46 at step 72. In addition, if after a predetermined number of failed lamp-start tries the lamp still will not light, then the system may shut down after providing a visible, audible or haptic feedback message to indicate a need for service or repair.

Figure 9:
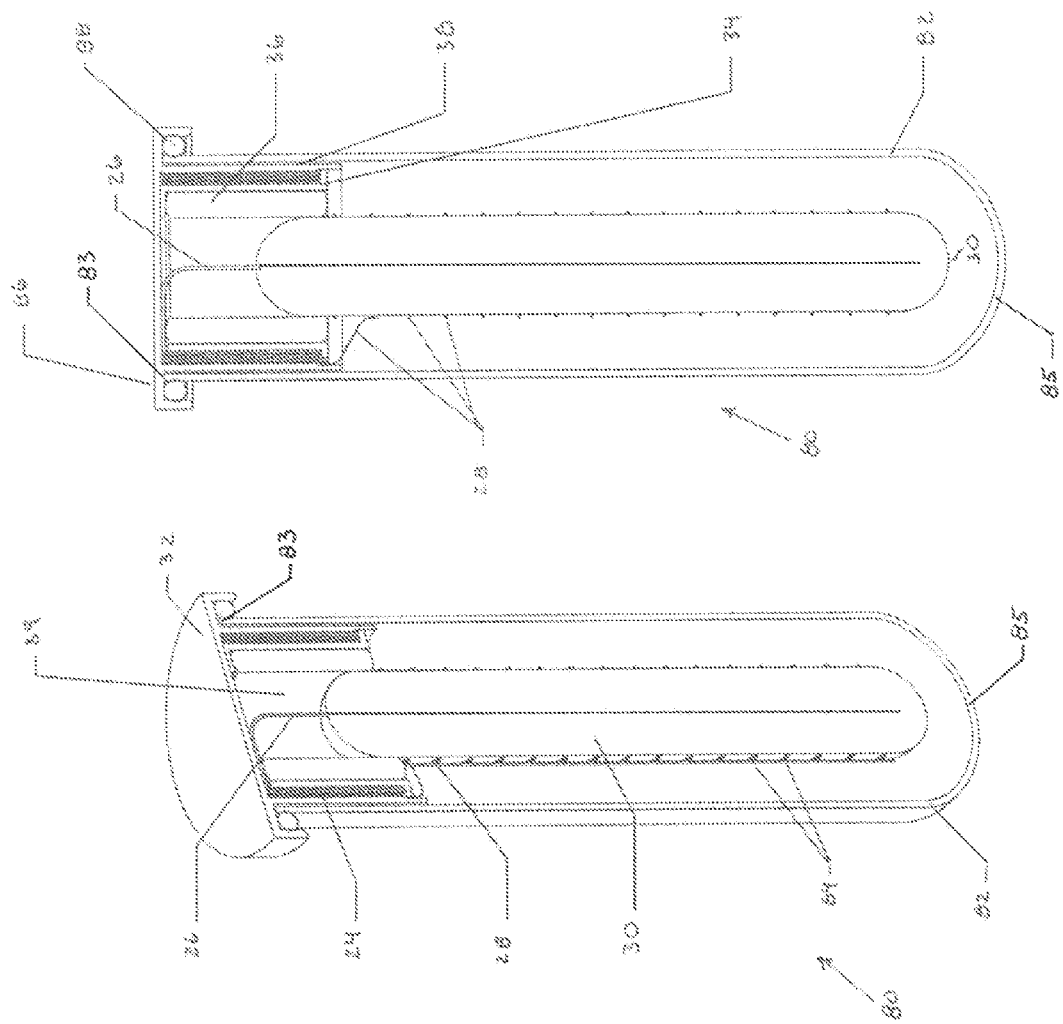
FIG. 9 illustrates vertical cross-sectional views of a dielectric barrier discharge lamp assembly including a conductive mesh outer electrode.
Figure 10:
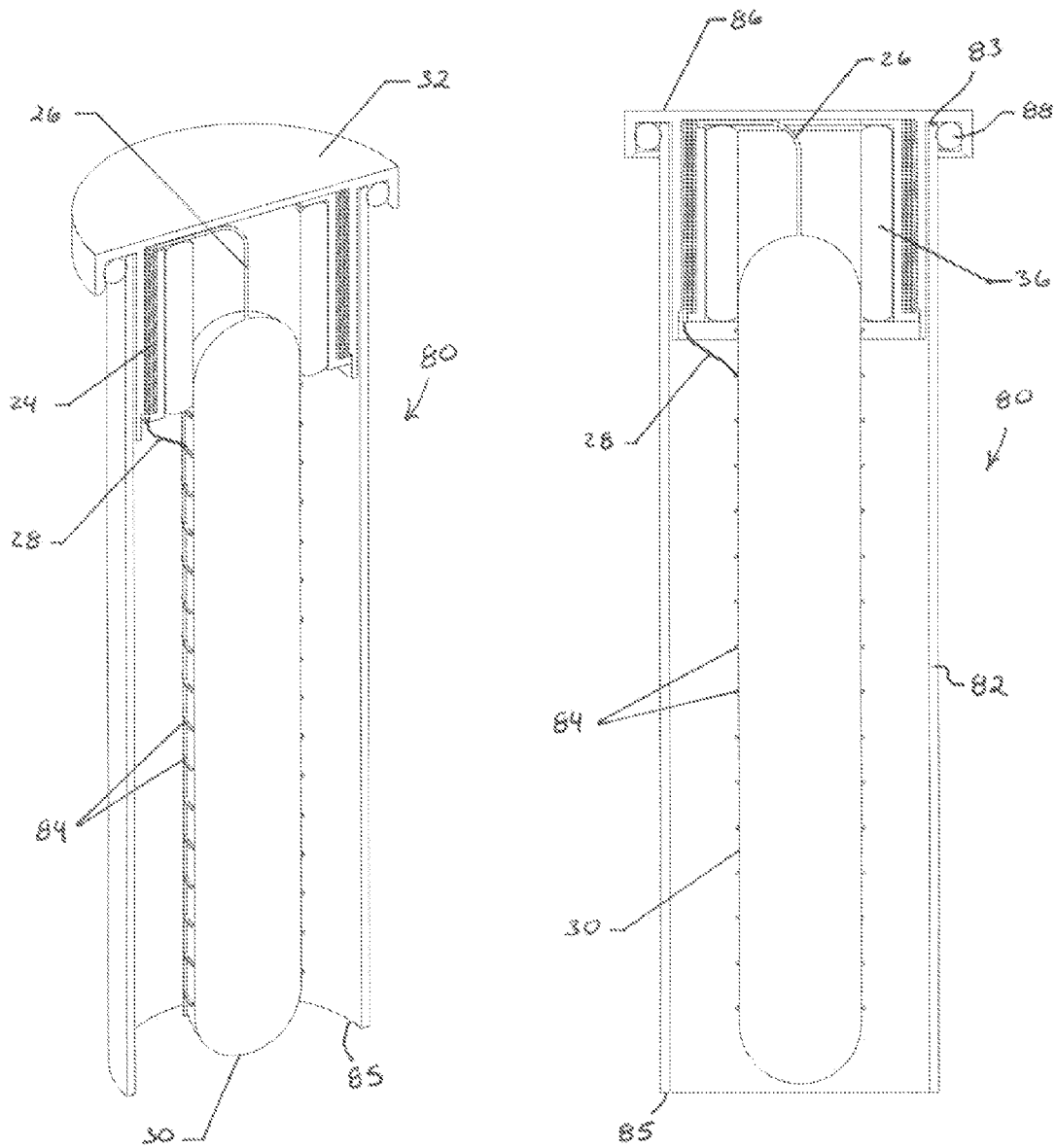
FIG. 10 illustrates vertical cross-sectional views of the lamp assembly of FIG. 9 adapted to allow a moving fluid along the mesh outer electrode.

A dielectric barrier discharge lamp assembly in accordance with a second embodiment is shown in FIGS. 9-10 and generally designated 80. The lamp assembly 80 is similar in function and structure to the lamp assembly 20 noted above, and includes a conductive mesh 84 applied to the exterior of the lamp body 30 and an elongated tube 82 encasing both the lamp body 30 and the conductive mesh 84. The conductive mesh 84 can alternatively be any suitable conducting layer applied to the exterior of the lamp body 30, including a metalized collar, stamped grid-work or other similar structure. As optionally shown in FIG. 9, the tube 82 includes a first (open) end 83 and a second (closed) end 85, where the first end 83 is sealably coupled to the assembly housing. In particular, the first end 83 of the tube 82 may be secured between an annular surface of the assembly housing 86 and an o-ring 88 to at least partially seal the interior of the quartz tube 82 and to permit access to the lamp body 30 for inspection, repair or replacement of the same. The tube 82 may be formed of any suitable material, including for example quartz or glass for the transmission of ultraviolet light. As optionally shown in FIG. 10, however, the tube 82 can be non-transparent, including an open second end 85 to allow the circulation of a moving fluid in the region between the lamp body 30 and the tube 82. Operation of this embodiment is substantially as described above in connection with the first embodiment, with the conductive mesh 84 functioning as an extension of the second electrode 28. The application of a high voltage current across the first electrodes 26 and the conductive mesh 84 can result in electrical discharge in the lamp body 30, and the resulting radiation of ultraviolet light through the exterior of the lamp body 30 and optionally through the tube 82.

Figure 11:
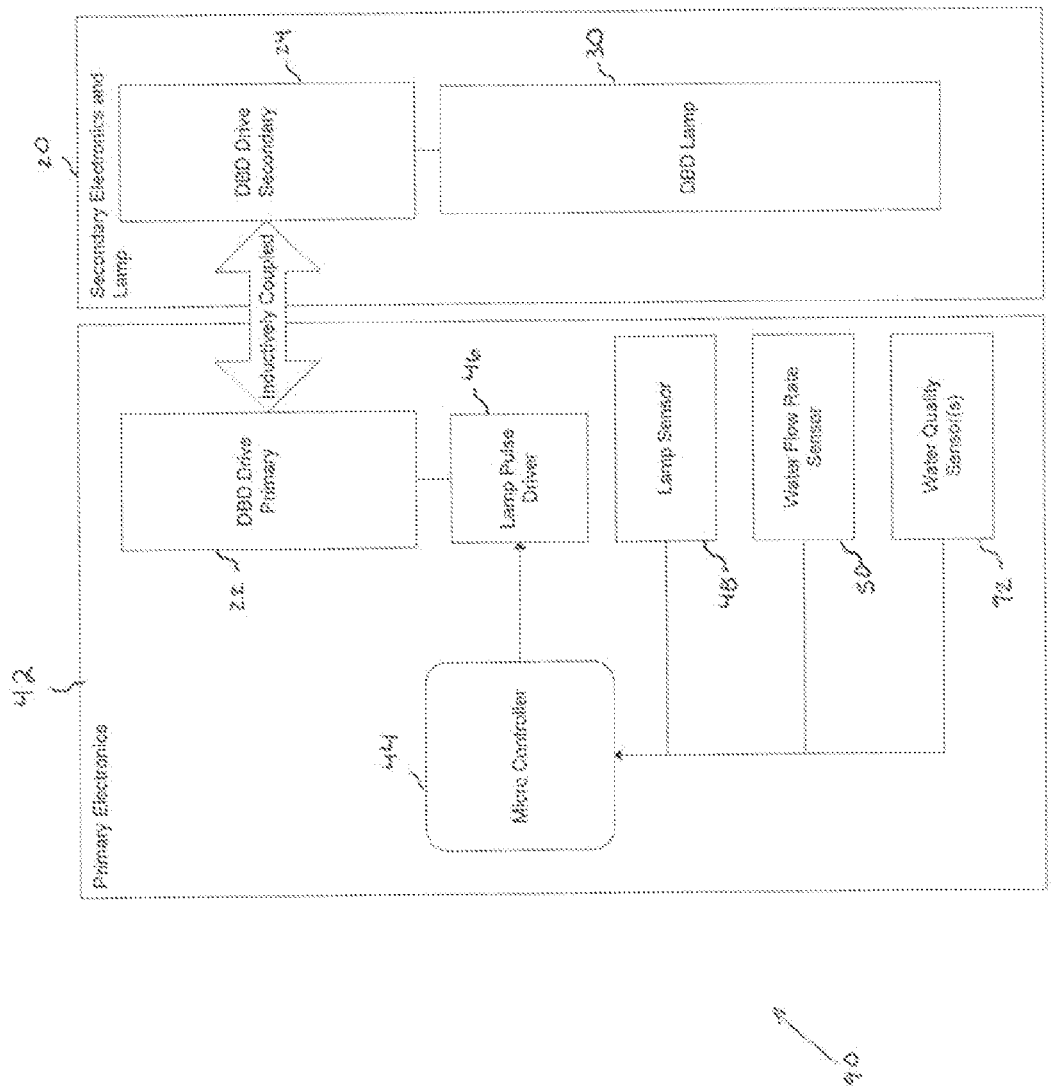
FIG. 11 is a block diagram of the base station and the lamp assembly including a base station water quality sensor.
Figure 12:
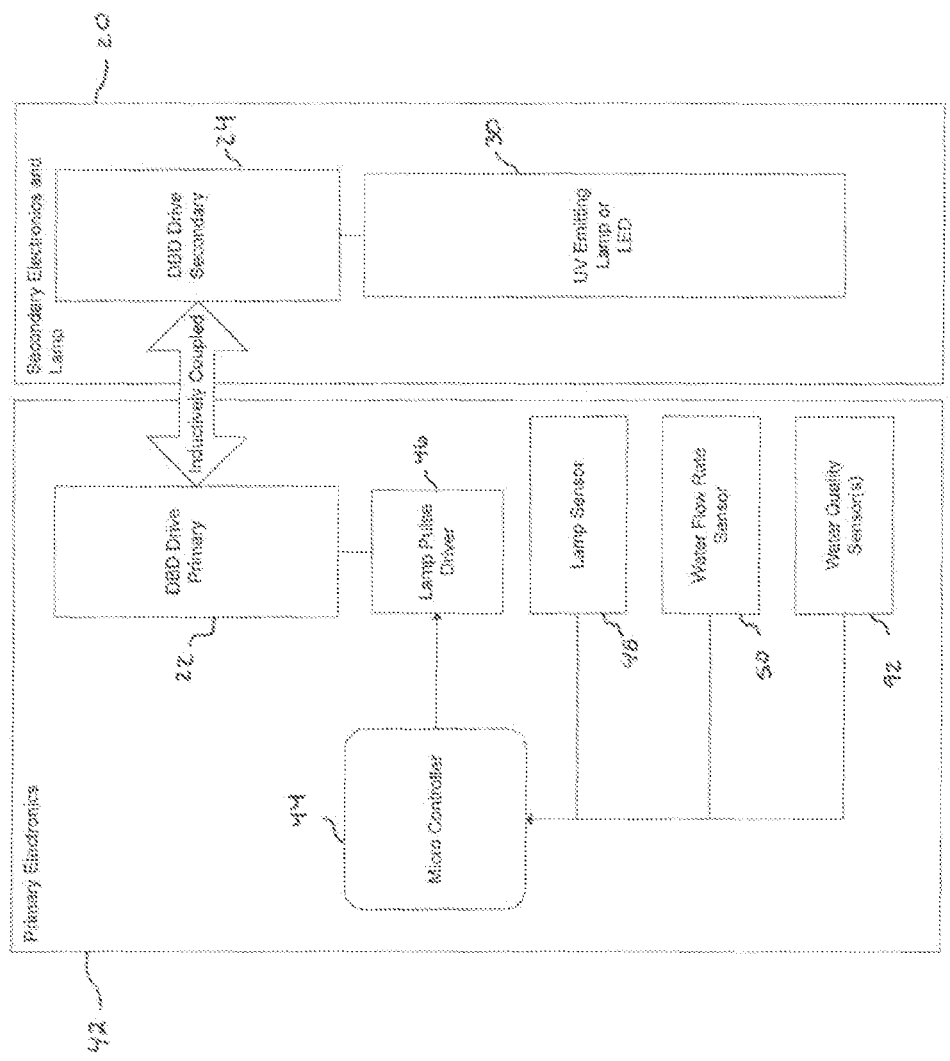
FIG. 12 is a block diagram of the base station and the lamp assembly including a UV emitting lamp or LED.

A dielectric barrier discharge lamp assembly in accordance with a third embodiment of the present invention is shown in FIG. 11 and generally designated 90. This embodiment differs from the first embodiment as shown in FIG. 4 with the inclusion of a base station water quality sensor 92. The water quality sensor 92 can also include an output electrically connected to the microcontroller 44. In the illustrated embodiment, the water quality sensor 92 may detect high turbidity, optionally requiring a higher ultraviolet intensity to achieve the desired disinfection. The water quality sensor 92 may also or alternatively detect the pH, total dissolved solids (TDS), hardness, total organic content (TOC), temperature or other related measurable water quality characteristic. In a variation of this embodiment, a fluid other than water can be treated, and the fluid quality characteristics can be selected for the given fluid. For example, if the fluid being treated is air, the feedback sensor 92 may measure characteristics such as temperature, humidity, dust concentration or chemical concentration. In substantially the same manner as described above in connection with the first embodiment, the microcontroller 44 can control the intensity of emitted ultraviolet light from the lamp body 30 to suitably disinfect or treat air based, at least in part, on the output of the air quality sensor 92. In a variation of the third embodiment and as shown in FIG. 12, the ultraviolet light may be generated by a source other than a dielectric barrier discharge lamp. For example, a compact fluorescent lamp (CFL), tube fluorescent lamp (TFL), ultraviolet LED, or array of ultraviolet LEDs may also serve as the ultraviolet light source 30. As is known in the art, each type of ultraviolet light source 30 may require a different control circuit to regulate the ultraviolet intensity. For example, lamp current, voltage, frequency, duty cycle etc. (or any combination thereof) may be involved and applied as needed for the given application.

Figure 13:
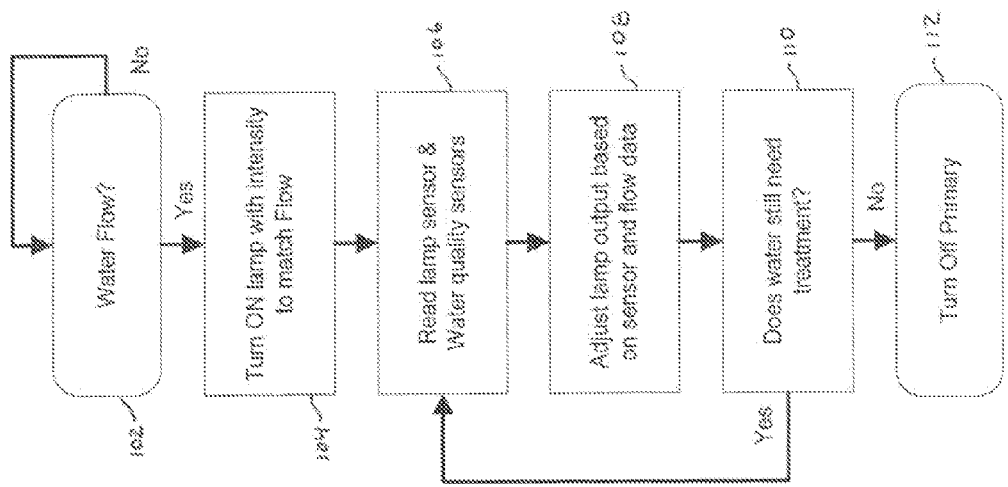
FIG. 13 is an operational flow chart of a water treatment system including a water quality sensor.

Operation of the third embodiment can be described in conjunction with the flowchart of FIG. 13. When water flow is detected by the water flow rate sensor 50 in step 102, the microcontroller 44 causes power to be delivered to the primary coil 22 at step 104. The level of power to be delivered at step 102 is determined by the microcontroller 44 by formula or through the use of a look-up table substantially as set forth above. At step 106, the microcontroller 44 verifies operation of the lamp through the lamp sensor 108. If the lamp is verified to be on and at the correct intensity, the lamp pulse driver 46 will continue to deliver the same power to the primary coil 22. If an adjustment is needed at step 108 based on the output of the lamp sensor 48, the water flow rate sensor 50 and/or the water quality sensor 92, the system may also adjust the power delivery to the primary coil 22. For example, a lower turbidity can require lower ultraviolet lamp intensities, while a higher turbidity can require higher ultraviolet lamp intensities. Similarly, a lower flow rate can require lower ultraviolet lamp intensities, while a higher flow rate can require higher ultraviolet lamp intensities. If after the lamp output is adjusted at step 108, water treatment is determined to be no longer needed at step 110, the microcontroller 44 can stop operation of the lamp pulse driver 46 at step 112. Otherwise the process resumes at step 106 and continues until treated water is no longer required.

Figure 14:
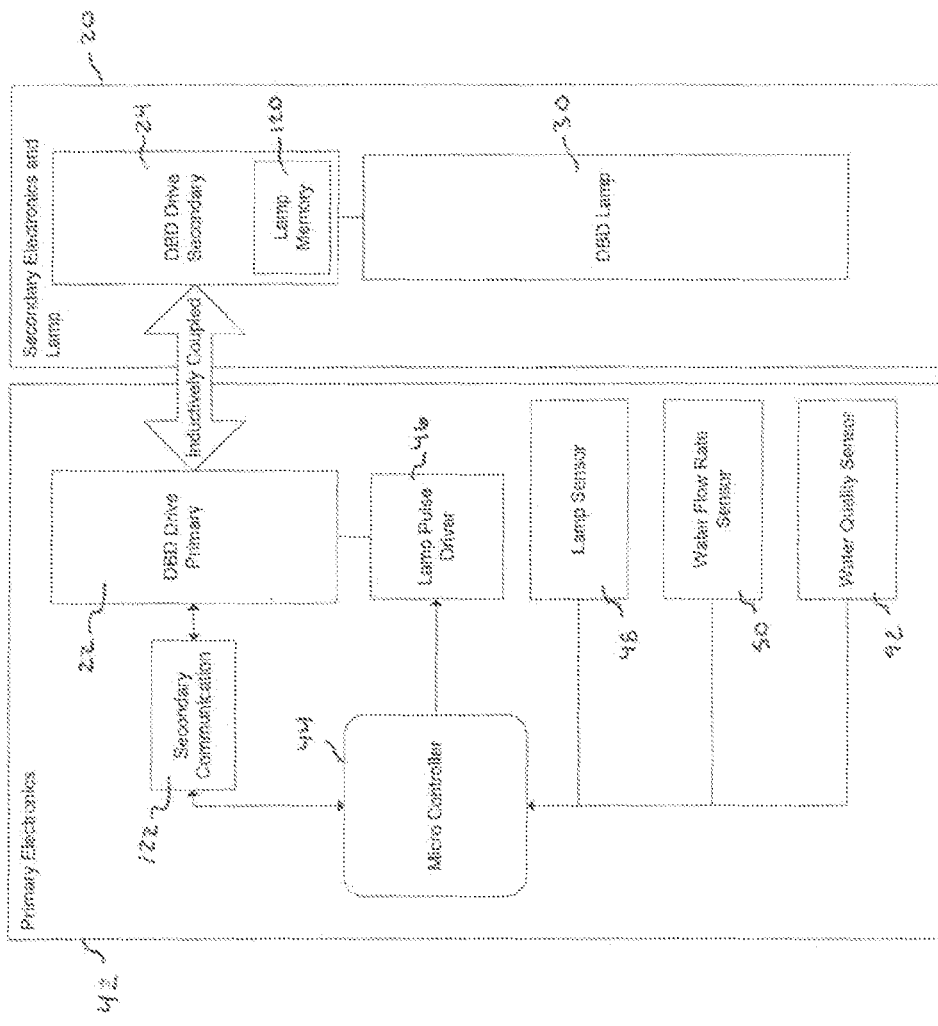
FIG. 14 is a block diagram of the base station and the lamp assembly including a computer readable lamp memory.
Figure 15:
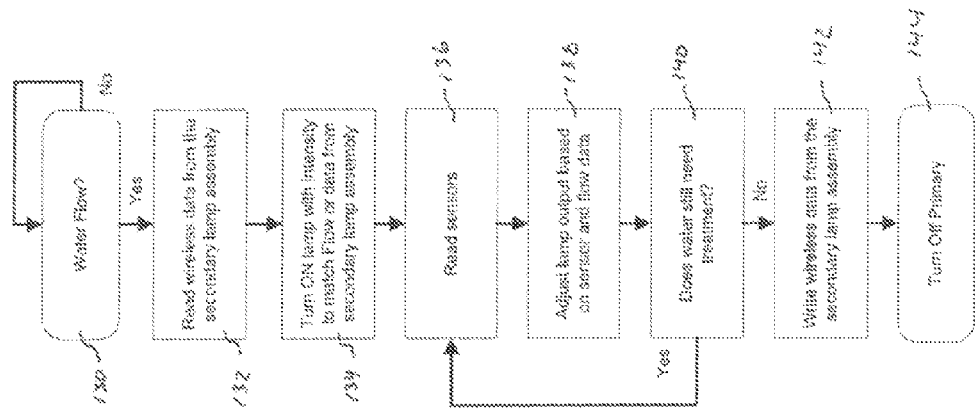
FIG. 15 is an operational flow chart of a water treatment system including a water quality sensor and a computer readable lamp memory.
Figure 16:
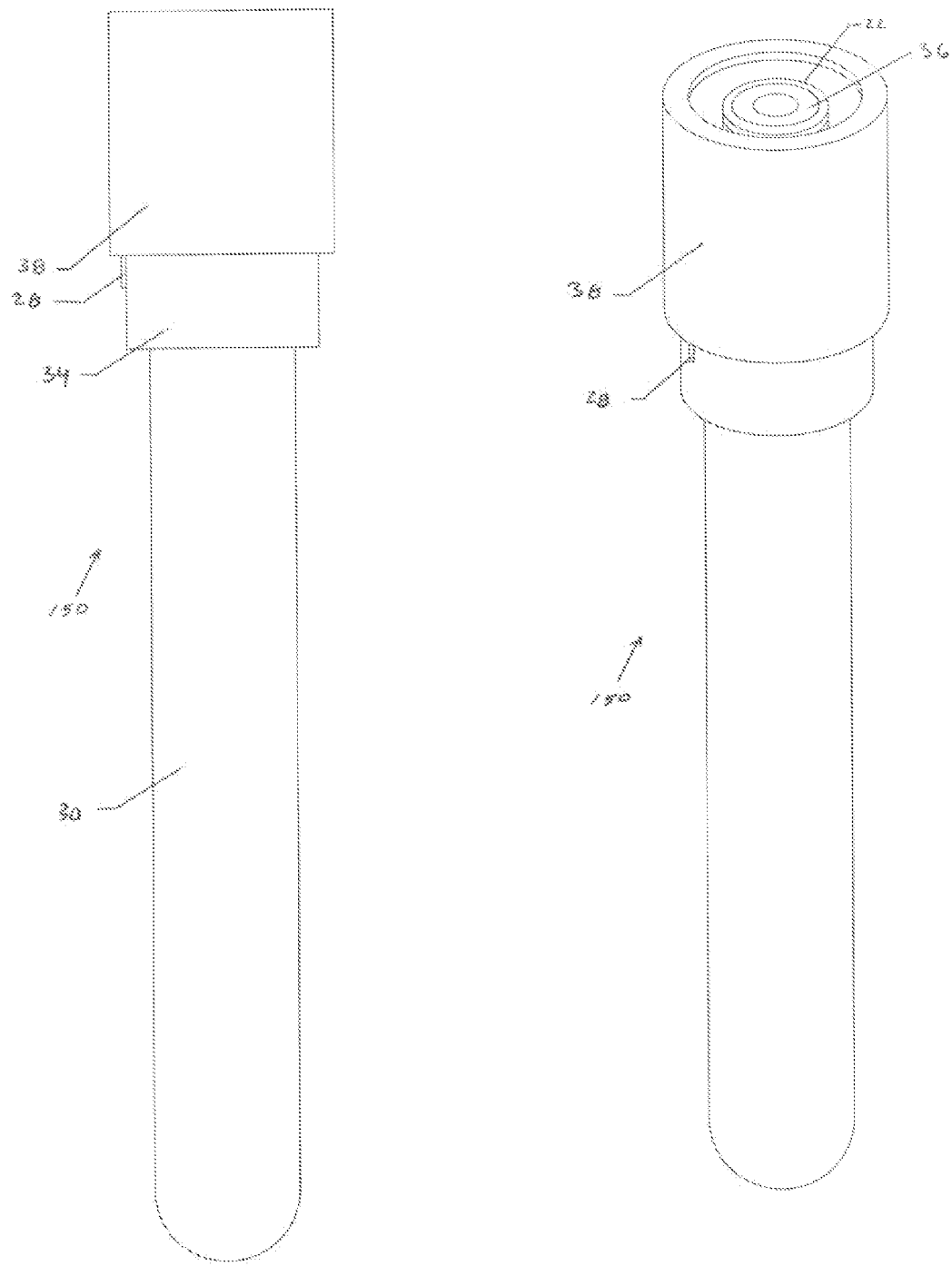
FIG. 16 illustrates elevational and perspective views of a dielectric barrier discharge lamp assembly including a primary coil received within the core of a secondary coil.

In a fourth embodiment of the present invention as shown in FIGS. 14-15, the lamp assembly 20 includes an RF antenna and a memory tag 120. The RF antenna and memory tag 120 can be any suitable combination for the desired application, optionally an RFID tag positioned within the secondary housing 38. The base station primary electronics 42 also includes a secondary communication circuit 122 electrically connected between the microcontroller 44 and the primary coil 22 for driving the primary coil 22 in a communications mode separate from the power supply mode described above in connection with the first embodiment. While operating in a communications mode, the primary coil 22 is driven by the secondary communication circuit 122 to transmit an optionally sinusoidal RF waveform to interrogate the lamp assembly memory tag 120. The RF antenna and memory tag 120 can respond by transmitting back another RF waveform either originally, or by reflecting back a portion of the interrogating waveform. The original or reflected-back RF waveform may further encode data stored internally in the memory tag 120. The response can be demodulated and decoded by the secondary communications unit 122 and microcontroller 44, which thereby identifies, counts, or otherwise interacts with the memory tag 120. When the primary coil 22 is instead operating in power supply mode, the RF antenna and memory tag 120 are largely unaffected by the pulsed waveform in the primary coil 22 described above in connection with FIG. 6. In addition, the primary coil 22 in a power transfer mode can operate at or near a frequency sufficiently distant from that of the range of communication frequencies. In this respect, the secondary communication circuit 122 is generally not affected by the primary coil 22 in power transfer mode. In addition, the primary 22 can operate at a sufficiently low power level in communication mode to minimize undesired power transfer between the primary and secondary coils 22, 24 when not in power transfer mode.

Consequently, the primary coil 22 of the present embodiment can read historical operational data from the memory tag 120 before each use, optionally associated with a unique lamp assembly serial number also stored in memory. The operational data can include, for example, the quantity of water treated, the number of illuminations of the dielectric barrier discharge lamp assembly, and the illumination time, for example. The operational data could also include lamp bias conditions—such as voltage, current, frequency and duty cycle—that are specific to an individual lamp body 30. Additionally, the primary coil 22 of the present invention can write operational data to the memory tag 120 after each use. By comparing the cumulative operational data against recommended limits for a given bulb body, the dielectric barrier discharge lamp of the present invention can provide users and/or service personal with an indication of the correct time for replacing the lamp body 30 or other components. In addition, the dielectric barrier discharge lamp can adjust the power applied to the primary coil 22 over time for a given lamp body 30 to compensate for the estimated reduction in luminescence at the desired wavelength(s) over the life of the lamp body 30. For example, the microcontroller 44 and lamp driver 46 can provide an increased peak voltage across the primary coil 22 over time, where the increased peak voltage can be based in part on a formula or a look-up table for a bulb body of a given operational age. Moreover, if there are appreciable variations in bias conditions (lamp voltage, current, frequency, duty cycle, etc.)

among a population of compatible lamp bodies, the present invention can drive the primary coil 22 in accordance with the known bias conditions from memory tag 120 for the attached lamp body 30. In this regard, the present invention can extend the useful life of the corresponding lamp body 30 to potentially offer a more robust and cost effective option over known prior art dielectric barrier discharge lamp systems.

Operation of the fourth embodiment can be further described in conjunction with the flowchart of FIG. 15. When water flow is detected in step 130, optionally via a water flow rate sensor 50, the primary coil 22 operates in a communications mode to read wireless data from the memory tag 120 associated with (or contained within) the secondary lamp assembly 20 at step 132. As noted above, the wireless data can include the cumulative prior operational use data and a unique lamp serial number. At step 134, the primary coil 22 can operate in a power supply mode under control of the microcontroller 44 and lamp driver 46 to provide power to the secondary coil 24. The amount of power applied at step 134 can vary from application to application, and can be based at least in part on the fluid flow rate and the cumulative prior operational data to achieve a desired lamp intensity. At step 136, the microcontroller 44 can evaluate or read the output of the lamp sensor 48, the water flow rate sensor 50 and/or the water quality sensor 92. At step 138, the system may also adjust the power delivery to the primary coil 22 based on the sensor data from step 136 and any changes in the volume flow rate of the fluid being treated. If at step 140 the water is determined to require further treatment, the process resumes at step 136. If, however, at step 140 the water is determined not to require further treatment (e.g., further irradiation with germicidal ultraviolet light), the primary coil 22 reverts to a communications mode to write wireless data to the memory tag 120 contained and/or associated with the secondary lamp assembly 20 at step 142. That data can include, for example, the cumulative operational use data for the lamp body 30 or other components of the dielectric barrier discharge lamp system. At step 144, the microcontroller 44 can stop operation of the primary coil 22 until the process resumes again at step 130. While described in connection with a water treatment system, the inductively powered dielectric barrier discharge lamp 20 assembly of the present embodiment can be used to treat any fluid, including liquid or gaseous fluids other than water.

Figure 17:
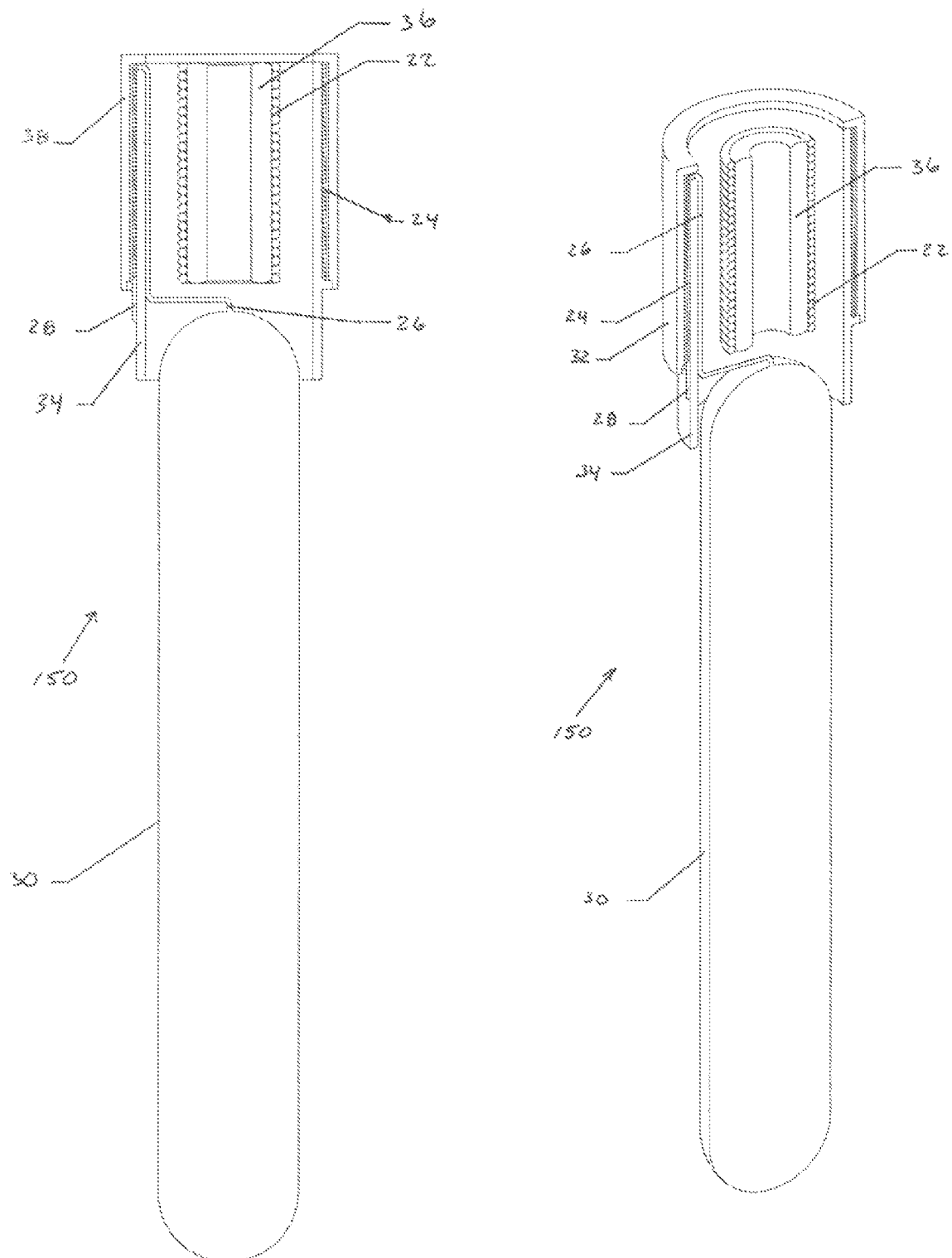
FIG. 17 illustrates vertical cross-sectional views of the lamp assembly of FIG. 16.
Figure 18:
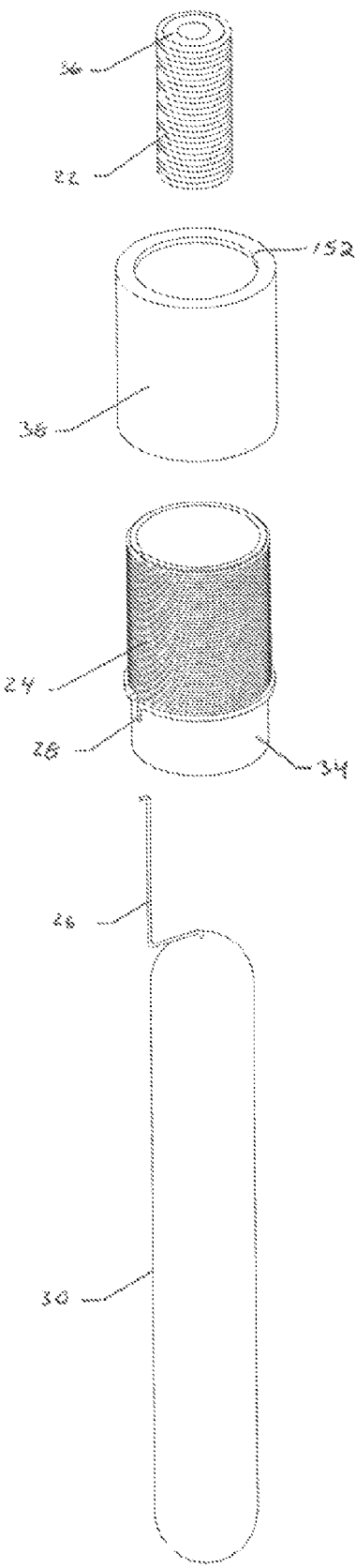
FIG. 18 is a partially exploded perspective view of the lamp assembly of FIG. 16.
Figure 19:
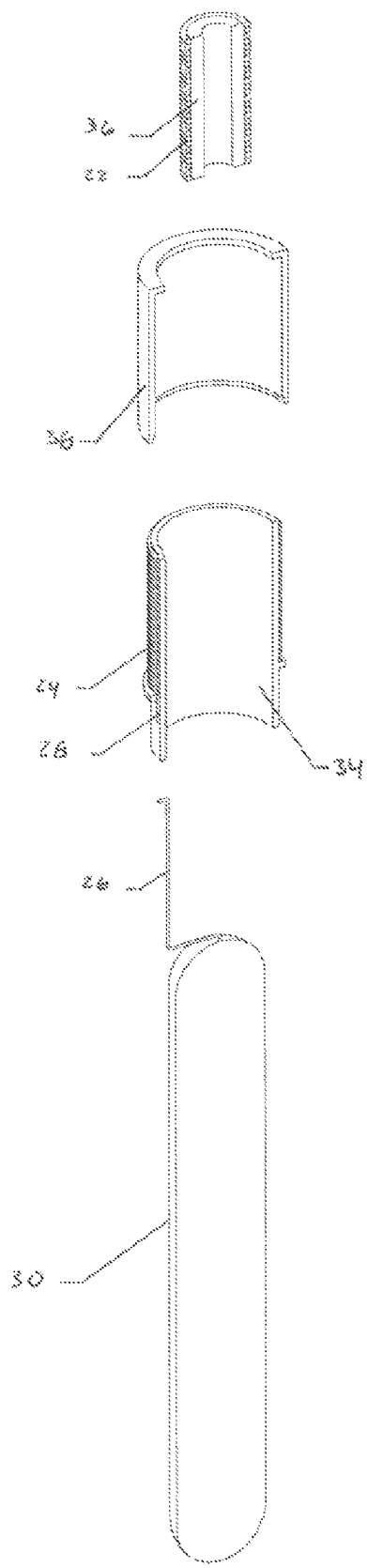
FIG. 19 is a partially exploded cross-sectional view of the lamp assembly of FIG. 16.

A dielectric barrier discharge lamp assembly in accordance with a fifth embodiment is shown in FIGS. 16-19 and generally designated 150. The lamp assembly 150 is similar in function and structure to the lamp assemblies 20 and 80 noted above, and further includes a primary coil 22 received within the core of the secondary coil 24. In particular, the primary and secondary coils 22, 24 are arranged in concentric relationship to each other, with the secondary coil 24 defining an inner diameter that is greater than an outer diameter defined by the primary coil 22. The primary coil 22 can further include a magnetic core 36, and the primary and secondary coils 22, 24 can be radially spaced apart from each other when the lamp assembly 150 is seated within the base station 42. The primary and secondary coils 22, 24 can include the same number of windings or different numbers of windings as desired, and can be formed of wire of a different gage as shown in FIG. 17. The lamp assembly 150 can further include an internal potting compound 39 interposed between the primary coil 22 and the secondary coil 24 to seal and optionally waterproof the secondary coil 24 and the first and second electrodes 26, 28. The primary coil 22 can form part of the base station 42 and can include first and second taps for electrical connection to the lamp pulse driver 46 or other suitable power supply, including both AC and DC power supplies for example. In use, the lamp assembly 150 can be press-fit or otherwise removably secured to the base station 42 through an axial opening 152 in the secondary housing 38, allowing the secondary coil 24 to register around the concentric inner primary coil 22. Advantageously, the magnetic core 36 remains a component of the base station 42, and not the lamp assembly 150, potentially lowering material and manufacturing cost associated with replacement lamp assemblies 150. The lamp assembly 150 can be used in combination with a fluid treatment system as noted above, and can be utilized across other applications benefitting from illumination in the ultraviolet, infrared or visible spectra. For example, the lamp assembly 150 may be incorporated into a device such as a spotlight, a flashlight, a lamp or into a cooking or manufacturing process fixture to deliver the appropriate spectrum of light to the given application. Further examples include ultraviolet cured materials processing, general lighting applications, and heat lamps.

Figure 20:
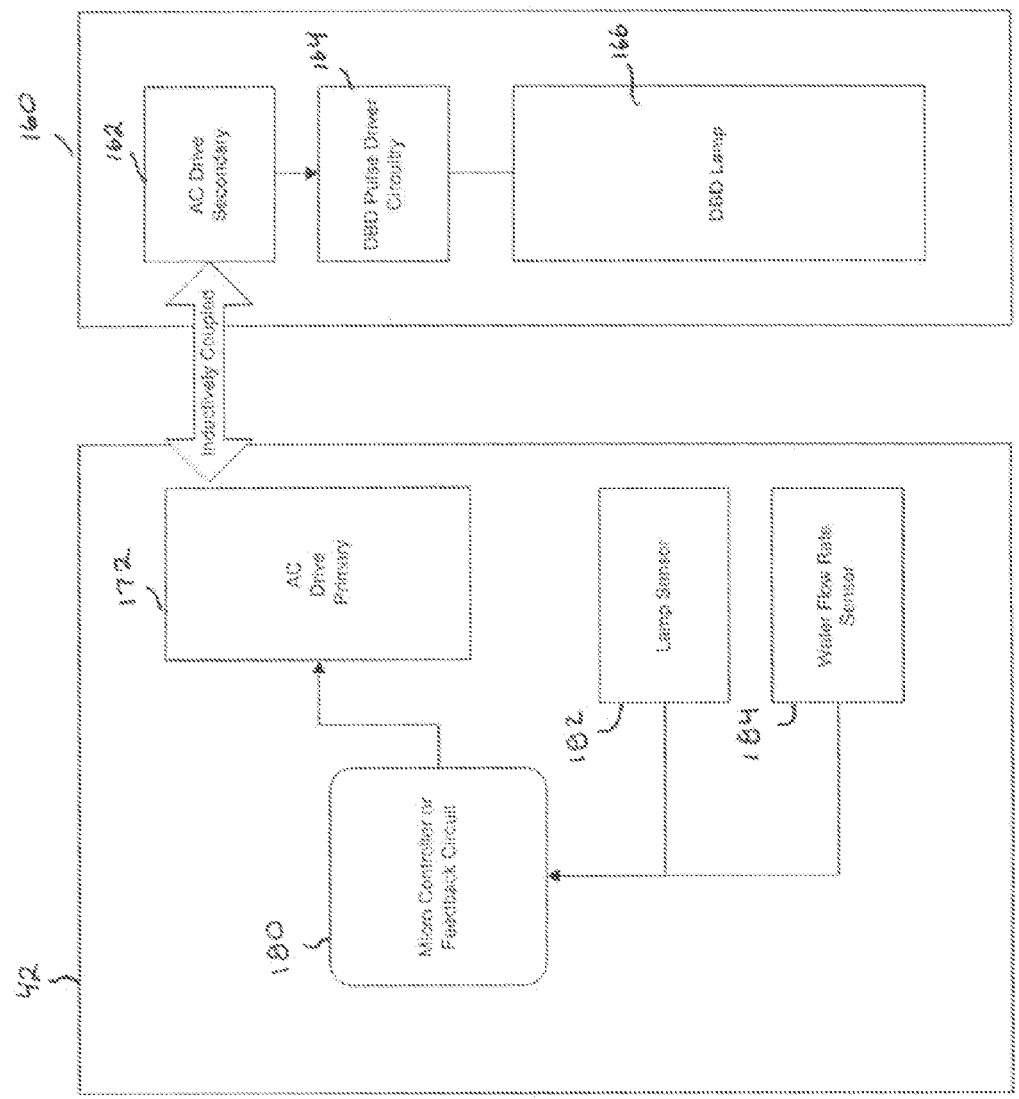
FIG. 20 is a block-diagram of a base station and a retrofit lamp assembly.
Figure 21:
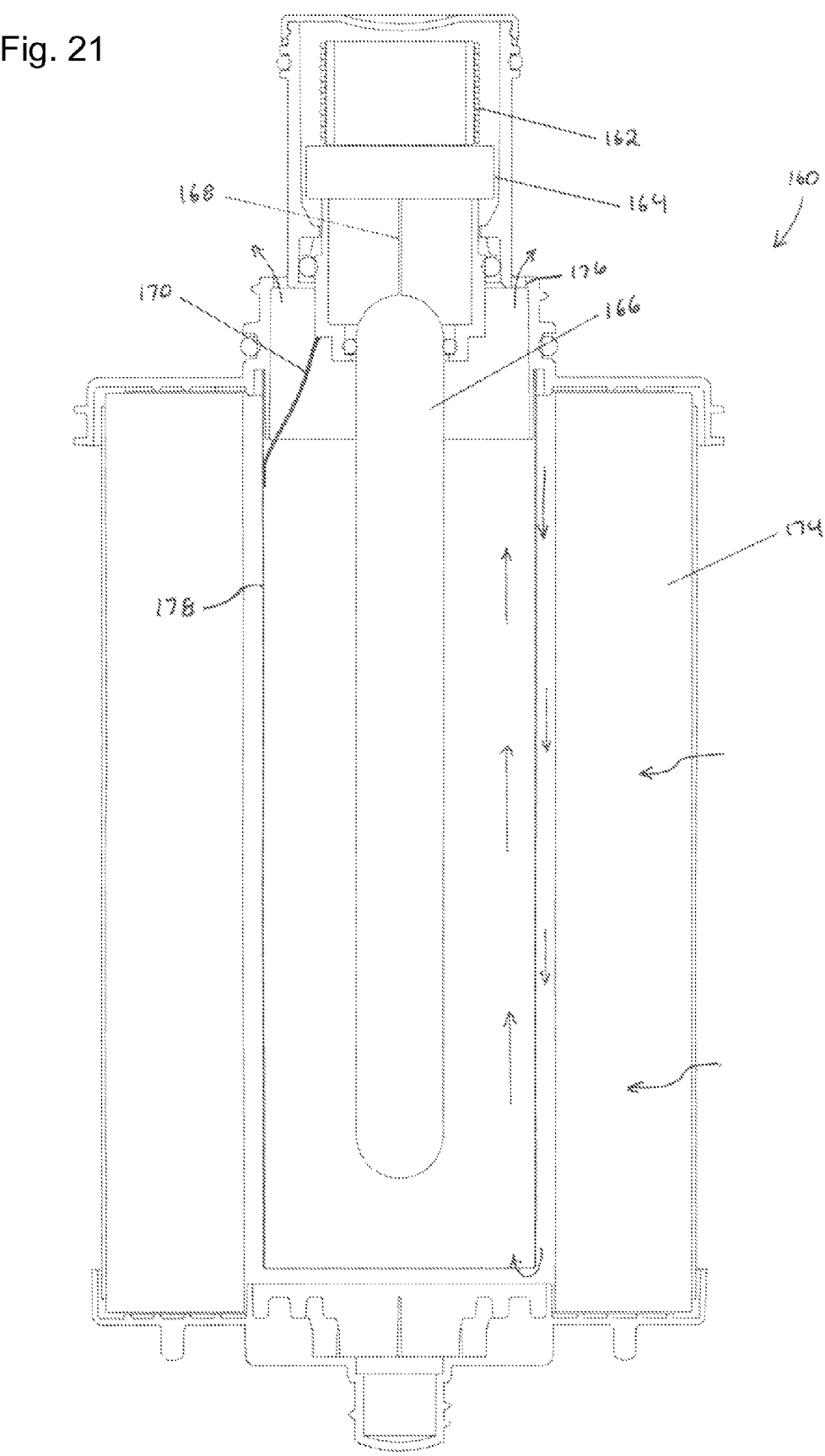
FIG. 21 illustrates a vertical cross-sectional view of the lamp assembly of FIG. 20 including a filter element.

A dielectric barrier discharge lamp assembly in accordance with a sixth embodiment is shown in FIGS. 20-21 and generally designated 160. The lamp assembly 160 is similar in function and structure to the lamp assemblies noted above, and is further adapted to convert a first driving voltage in the inductively coupled secondary coil into a second driving voltage for the first and second electrodes. For example, the lamp assembly 160 can be further adapted to convert a driving voltage typically associated with gas discharge lamps (e.g., CFL and TFL lamps) and incandescent lamps into a suitable driving voltage for a dielectric barrier discharge lamp. In this respect, the lamp assembly 160 can function as a retrofit lamp assembly for base stations and/or ballasts normally adapted to drive gas discharge lamps and/or incandescent lamps, for example.

Referring now to FIGS. 20-21, the lamp assembly 160 can include a secondary coil 162, a pulse driver circuit 164 electrically connected to the secondary coil 162, and first and second electrodes 168, 170 electrically connected to or within the pulse driver circuit 164, with at least one of the electrodes being connected to the lamp body 166. The secondary coil 162 can be removable with respect to a primary coil 172, the primary coil being optionally associated with a base station 42 substantially as set forth above in connection with FIG. 4. The pulse driver circuit 164 can include any circuitry adapted to convert an AC voltage into a DC voltage, including for example a rectifier. The pulse driver circuit 164 can further include a switching circuit to generate the desired driving voltage for the lamp body 166. For example, the pulse driver circuit 164 can convert a first time-varying driving voltage into a second time-varying driving voltage including a series of short duration pulses having variable parameters. These variable parameters can directly or indirectly affect the luminescent output of the lamp body 166 as set forth above, and can include for example frequency, period, duty cycle, pulse width, amplitude and combinations thereof. The second time-varying voltage is then applied across first and second electrodes 168, 170 to create an electrical discharge in the lamp body 166.

As also shown in FIG. 21, the lamp assembly 160 can optionally include a filter assembly to remove particulate matter and organic contaminates from a moving fluid. In one embodiment, the filter assembly can include a carbon block filter 174 positioned in the flow path between the source of fluid and the lamp body 166. For example, the carbon block filter 174 can be cylindrical and/or can be sized to radially encompass the lamp body 166 along a substantial portion of its length. As also optionally shown in FIG. 21, the moving fluid can flow radially inward through the carbon block filter 174, which can include a mass of carbon-activated particles to remove a percentage of particulate matter and organic contaminants. The flow path can continue along the lamp body 166 in a generally axial direction to increase the exposure of the moving fluid to optionally germicidal radiation from the lamp body 166, before being discharged through an axially disposed annular ring 176 on an upper surface of the lamp assembly 160. The second electrode 170 is shown as extending downwardly from the pulse driver circuit 164, being electrically connected to a reflective and optionally conductive sleeve 178 for forming an extension of the second electrode 170. In the present embodiment, the sleeve 178 is formed of stainless steel, while in other embodiments the sleeve 178 is formed of aluminum or any other material suitable for the application. Still further optionally, the second electrode 170 can include any of the configurations described herein, including for example the conducting fluid electrode as set forth above in connection with FIGS. 1-3, the mesh electrode as generally described above in connection with FIGS. 9-10, or the electrode and electrically permitable sleeve set forth below in connection with FIG. 22.

In use, a microcontroller or feedback circuit 180 associated with the base station 42 can generate a time-varying current in the primary coil 172. The time-varying current can vary based on a sensor output, including for example a lamp sensor output 182 and/or water flow rate sensor output 184 substantially as set forth above in connection with FIG. 4. When the secondary coil 162 is closely coupled to the primary coil 172, for example when the lamp assembly 160 is seated within the base station 42, the primary coil 172 can induce within the secondary coil 162 a corresponding time-varying current. The lamp assembly 160, and consequently the secondary coil 162 and filter 174, can be physically separable from the base station 42 to extend the useful life of the base station 42 as multiple lamps 166 and filters 174 are replaced over repeated uses.

Figure 22:
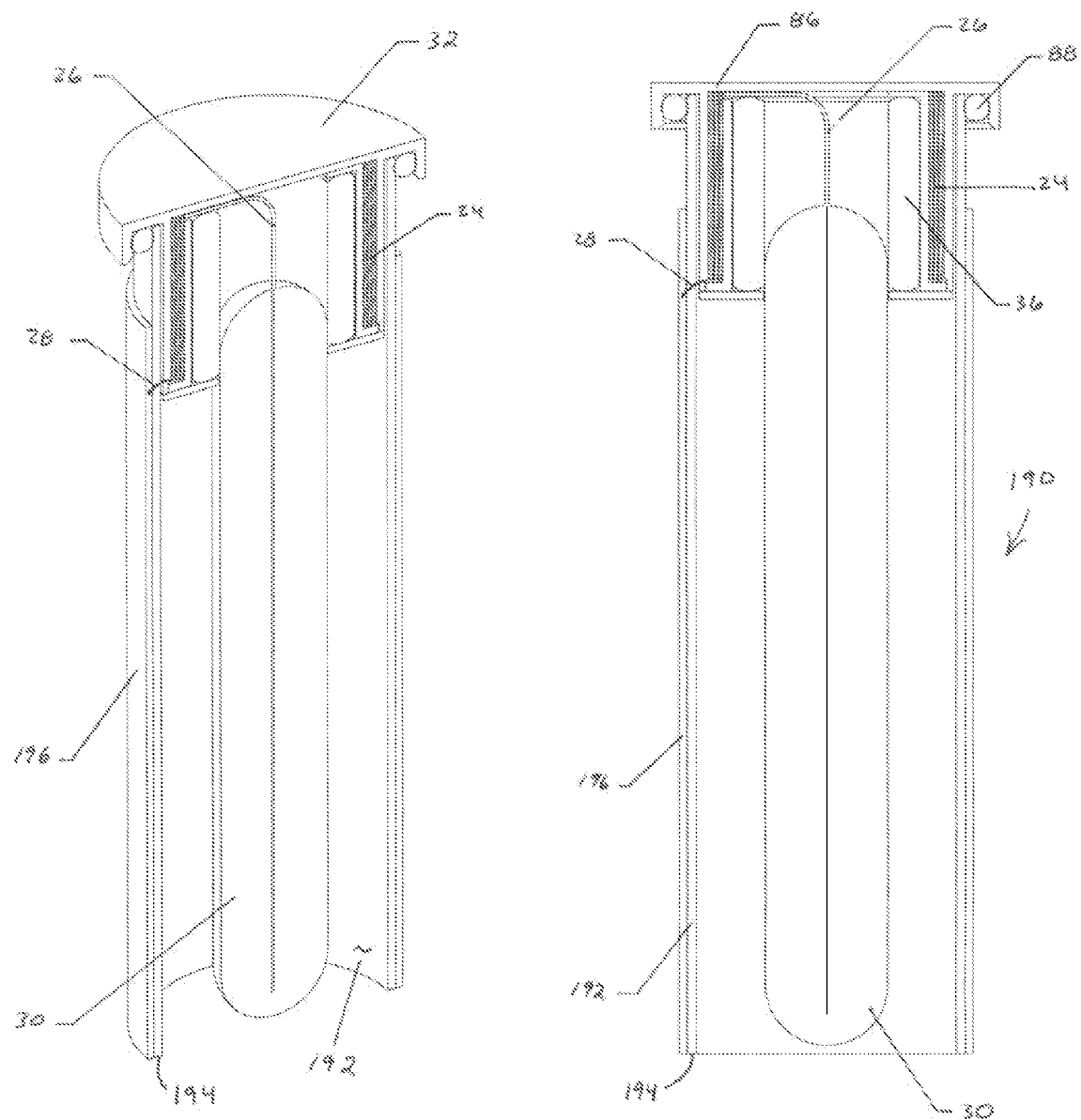
FIG. 22 illustrates vertical cross-sectional views of a lamp including an outer electrode and an electrically permitable outer sleeve.

A dielectric barrier discharge lamp assembly in accordance with a seventh embodiment is shown in FIG. 22 and generally designated 190. The lamp assembly 190 is similar in function and structure to the lamp assemblies noted above, and further includes an electrically permitable sleeve 192 spaced apart from the lamp body 30 to accommodate a stationary or moving fluid therebetween. The sleeve 192 may be formed of any material exhibiting a desirable electrical permittivity, including transparent, translucent and opaque materials, and can be generally non-conductive. For example, the sleeve 192 can be a transparent dielectric such as quartz or glass, or an opaque or translucent dielectric such as ceramic, plastic or foam, or other suitable material as desired. The sleeve 192 can include an open end 194 to allow the circulation of a moving fluid to and/or from the region between the lamp body 30 and the sleeve 192. The lamp assembly 190 can further include a conducting layer 196 disposed about the exterior of the sleeve 192 and spaced apart from the volume of moving fluid. The conducting layer 196 can be electrically connected to the second electrode 28, functioning as an extension of the second electrode 28 to provide a uniform and generally radial electric field between the first electrode 26 in the lamp body 30 and the conducting layer 196. In this regard, the moving fluid is isolated from the first and second electrodes 26, 28 to prevent unwanted ionization of the fluid, for example. The application of a high voltage difference across the first and second electrodes 26, 28 can result in electrical discharge in the discharge gap in the lamp body 30, resulting in the radiation of light through the exterior of the lamp body 30 substantially as set forth above. The lamp body 30 can further include a luminescent layer or coating suitable for converting the radiated light into germicidal ultraviolet light. Alternatively, or in addition, the lamp body 30 can contain a gas, for example krypton chloride gas, adapted to radiate ultraviolet light without the aid of a fluorescent coating. Optionally, the sleeve 192 can further include a reflective inner layer or coating to further enhance the application of germicidal light or other light in the region between the lamp body 30 and the sleeve 192.

While the above systems and methods are described as pertaining to a dielectric barrier discharge lamp, it should be noted that the systems and methods of the present invention can be suitably adapted for use in conjunction with a variety of lamp systems other than dielectric barrier discharge lamps, including gas discharge lamps, incandescent lamps and light emitting diodes. For example, the above systems and methods can improve the control of existing or subsequently developed lamps based on the lamp output and/or based on a characteristic of a fluid. Also by example, the above systems and methods can be adapted for use with other than water treatment systems, including for example luminary systems utilizing gas discharge lamps, dielectric barrier discharge lamps, incandescent lamps, light emitting diodes, and other lamps, whether now known or hereinafter developed.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A point-of-use water treatment system comprising:
    a base station including an inductive primary adapted to generate a time-varying electromagnetic field in a power supply mode and in a communications mode, the base station defining a fluid flow path; and
    a lamp assembly adapted to be removably supported within the base station and adapted to radiate ultraviolet light for treating a fluid moving through the fluid flow path, the lamp assembly including:
        an inductive secondary adapted to receive power from the inductive primary, first and second electrodes electrically coupled to the inductive secondary, an ultraviolet lamp electrically coupled to the first and second electrodes, an RF antenna for communication with the inductive primary, and a memory tag associated with the RF antenna,
        wherein the inductive secondary is adapted to receive power from the inductive primary when operating in the power supply mode and adapted to supply the power to the first and second electrodes to energize the ultraviolet lamp, and
        wherein the inductive primary is operable in the communications mode to read data from the lamp assembly memory tag before energizing the ultraviolet lamp and operable in the communications mode to write data to the lamp assembly memory tag after energizing the ultraviolet lamp without a separate coil for RF communications to the lamp assembly.

2. The point-of-use water treatment system of claim 1 wherein the ultraviolet lamp is a compact fluorescent lamp, a tube fluorescent lamp, or an LED lamp.

3. The point-of-use water treatment system of claim 1 wherein the inductive secondary defines an outer radius less than an inner radius defined by the inductive primary, the inductive secondary and the inductive primary being substantially coaxial.

4. The point-of-use water treatment system of claim 1 further including a pulse driver circuit electrically connected between the inductive secondary and the first and second electrodes to convert a first voltage received by the inductive secondary into a second voltage applied across the first and second electrodes.

5. The point-of-use water treatment system of claim 1 wherein the base station includes a sensor to measure the luminescent output of the lamp assembly.

6. The point-of-use water treatment system of claim 1 wherein the base station includes a sensor to measure the turbidity, pH, or temperature of a fluid moving through the base station fluid flow path.

7. The point-of-use water treatment system of claim 1 wherein the base station includes a sensor to measure the flow rate of the fluid moving through the base station fluid flow path.

8. The point-of-use water treatment system of claim 1 wherein the RF antenna is adapted to generate a waveform for transmission to the inductive primary.

9. The point-of-use water treatment system of claim 1 wherein the RF antenna is adapted to reflect a waveform for reception by the inductive primary.

10. The point-of-use water treatment system of claim 1 wherein the inductive secondary extends around a magnetic core.

11. The point-of-use water treatment system of claim 1 wherein the inductive secondary is received within an interior opening of the inductive primary such that the inductive primary and the inductive secondary are concentrically arranged with respect to each other.

12. The point-of-use water treatment system of claim 1 wherein the data read from the lamp assembly memory tag includes historical operational data of the lamp assembly.

13. The point-of-use water treatment system of claim 1 wherein the data written to the lamp assembly memory tag includes updated operational data of the lamp assembly.

* * * * *